US011295299B2

(12) United States Patent
Fujita et al.

(10) Patent No.: US 11,295,299 B2
(45) Date of Patent: *Apr. 5, 2022

(54) INFORMATION PROCESSING APPARATUS

(71) Applicant: Sony Corporation, Tokyo (JP)

(72) Inventors: Norihiko Fujita, Tokyo (JP); Koji Ito, Tokyo (JP); Hisanori Arai, Tokyo (JP); Masaji Nagai, Tokyo (JP)

(73) Assignee: Sony Corporation, Tokyo (JP)

( * ) Notice: Subject to any disclaimer, the term of this patent is extended or adjusted under 35 U.S.C. 154(b) by 809 days.

This patent is subject to a terminal disclaimer.

(21) Appl. No.: 15/297,655

(22) Filed: Oct. 19, 2016

(65) Prior Publication Data

US 2017/0083908 A1 Mar. 23, 2017

Related U.S. Application Data

(63) Continuation of application No. 10/548,477, filed as application No. PCT/JP03/14190 on Nov. 7, 2003, now Pat. No. 9,497,796.

(30) Foreign Application Priority Data

Mar. 7, 2003 (JP) ............................... JP2003-61943

(51) Int. Cl.
*G06Q 20/36* (2012.01)
*G06Q 20/32* (2012.01)
(Continued)

(52) U.S. Cl.
CPC ......... *G06Q 20/3678* (2013.01); *G06Q 20/06* (2013.01); *G06Q 20/065* (2013.01);
(Continued)

(58) Field of Classification Search
CPC ............. G06Q 20/3678; G06Q 20/382; G06Q 20/065; G06Q 20/327; G06Q 20/3227;
(Continued)

(56) References Cited

U.S. PATENT DOCUMENTS

| 4,580,040 A | * | 4/1986 | Granzow ............... G06Q 20/04 235/379 |
| 5,887,266 A | | 3/1999 | Heinonen et al. |

(Continued)

FOREIGN PATENT DOCUMENTS

| CN | 1386237 A | 12/2002 | |
| EP | 1221669 A1 * | 7/2002 | ........... G07F 7/0886 |

(Continued)

OTHER PUBLICATIONS

European Patent Office Communication Not Disclosed (dated Dec. 19, 2016) (Year: 2016).*

(Continued)

*Primary Examiner* — John W Hayes
*Assistant Examiner* — Dennis G Keritsis
(74) *Attorney, Agent, or Firm* — K&L Gates LLP

(57) ABSTRACT

An information processing apparatus is provided. The information processing apparatus includes an electronic money unit including a processor, a memory configured to store a balance of electronic monetary value, a terminal communication unit configured to receive a first command from an electronic money terminal using a terminal antenna, a mobile communication unit including a phone antenna for mobile communication via a base station; an interface unit configured to receive a second command from an electronic money server through an encrypted connection over the mobile communication; wherein the processor is configured to change the balance of electronic monetary value in response to at least one of the first command and the second command.

11 Claims, 17 Drawing Sheets

(51) Int. Cl.

| | | |
|---|---|---|
| *G06Q 20/06* | (2012.01) | |
| *G07F 7/08* | (2006.01) | |
| *G06Q 20/34* | (2012.01) | |
| *H04M 17/02* | (2006.01) | |
| *H04W 88/06* | (2009.01) | |
| *G06Q 20/38* | (2012.01) | |
| *H04L 12/58* | (2006.01) | |
| *H04W 4/24* | (2018.01) | |
| *H04L 51/04* | (2022.01) | |

(52) U.S. Cl.
CPC ......... *G06Q 20/32* (2013.01); *G06Q 20/327* (2013.01); *G06Q 20/3226* (2013.01); *G06Q 20/3227* (2013.01); *G06Q 20/341* (2013.01); *G06Q 20/363* (2013.01); *G06Q 20/382* (2013.01); *G07F 7/0886* (2013.01); *H04L 51/04* (2013.01); *H04M 17/02* (2013.01); *H04W 88/06* (2013.01); *H04W 4/24* (2013.01)

(58) Field of Classification Search
CPC .. G06Q 20/32; G06Q 20/3226; G06Q 20/363; G06Q 20/341; G06Q 20/06; G06Q 20/02; H04L 51/04; H04W 88/06; H04W 4/24; H04M 17/02; G07F 7/1008; G07F 7/0886; G07F 7/0866
See application file for complete search history.

(56) References Cited

U.S. PATENT DOCUMENTS

| | | | |
|---|---|---|---|
| 6,016,956 A | 1/2000 | Takami et al. | |
| 6,038,549 A | 3/2000 | Davis et al. | |
| 6,098,055 A | 8/2000 | Watanabe | |
| 6,539,364 B2* | 3/2003 | Moribatake | G06Q 20/02 705/1.1 |
| 6,729,550 B2 | 5/2004 | Seita et al. | |
| 6,771,981 B1 | 8/2004 | Zalewski et al. | |
| 7,051,933 B1 | 5/2006 | Nagaoka et al. | |
| 7,107,247 B2 | 9/2006 | Kinoshita et al. | |
| 7,475,044 B1* | 1/2009 | Kawai | G06Q 20/04 235/380 |
| 7,729,986 B1 | 6/2010 | Hoffman et al. | |
| 2002/0009989 A1 | 1/2002 | Kanesaka et al. | |
| 2002/0087484 A1* | 7/2002 | Sasaki | G06Q 20/04 705/77 |
| 2002/0116344 A1 | 8/2002 | Kinoshita et al. | |
| 2002/0161703 A1 | 10/2002 | Okamoto et al. | |
| 2002/0184096 A1 | 10/2002 | Kawahara et al. | |
| 2004/0127256 A1* | 7/2004 | Goldthwaite | G06K 7/0004 455/558 |
| 2014/0304828 A1* | 10/2014 | Hollier | G06F 21/606 726/26 |
| 2014/0316994 A1* | 10/2014 | Hagemann | G06F 21/36 705/75 |

FOREIGN PATENT DOCUMENTS

| | | | | |
|---|---|---|---|---|
| EP | 1221669 A1 | 7/2002 | | |
| GB | 2347255 A | 8/2000 | | |
| JP | 2000-076399 A | 3/2000 | | |
| JP | 2001-184545 A | 7/2001 | | |
| JP | 2001-344537 A | 12/2001 | | |
| JP | 2001-527247 A | 12/2001 | | |
| JP | 2002-197388 A | 7/2002 | | |
| JP | 2002-352173 A | 12/2002 | | |
| JP | 2003-016398 A | 1/2003 | | |
| JP | 2003-187167 A | 7/2003 | | |
| JP | 3840021 B2 * | 11/2006 | ............ | G06Q 20/24 |
| TW | 482971 B | 4/2002 | | |
| WO | 96/25828 A1 | 8/1996 | | |
| WO | 01/09851 A1 | 2/2001 | | |
| WO | 01/48710 A1 | 7/2001 | | |
| WO | WO 01/48710 * | 7/2001 | ............... | G06F 7/10 |
| WO | 03/009206 A1 | 1/2003 | | |

OTHER PUBLICATIONS

Base station—Wikipedia (Year: 2020).*
Microsoft Computer Dictionary, Microsoft Press, 5th Ed., p. 53 (Year: 2002).*
Masahiko Itoh "Contactless IC Card Technology and Application" Information Processing, vol. 43, third edition, Mar. 2002, pp. 304-307.
"Wide band CDMA technology," Xu yan zhen, New Quarterly, Oct. 2001, pp. 156-163, Zong Sham Science Research Center, Taiwan.
"Mobile communication system," Chen Ke ren, Mar. 1999, Chapter 8, Ru lin Publishing Company, Taiwan.
Patent Abstracts of Japan, vol. 2003, No. 04, Apr. 2, 2003.

* cited by examiner

FIG. 6

| ELECTRONIC-MONEY ID | USER NAME | PASSWORD | ISSUER | IC CHIP ID | ... |
|---|---|---|---|---|---|
| 61 | 62 | 63 | 64 | 65 | |
| 12345678 | YAMADA TARO | abcdefg | ISSUER A | 5477816 | ... |
| 87654321 | KATO TETSUYA | hijklmn | ISSUER B | 8547756 | ... |
| ... | ... | ... | ... | ... | ... |

FIG. 7

| | CHARGE | | | SETTLE | | |
|---|---|---|---|---|---|---|
| ELECTRONIC-MONEY ID | TERMINAL ID | DATE AND TIME | VALUE | TERMINAL ID | DATE AND TIME | VALUE |
| 12345678 | 547816 · · · | · · · | 1000 | 2547657 | · · · | 2000 |
| | 347895 · · · | · · · | 3000 | | | |
| 87654321 | · · · | · · · | · · · | · · · | · · · | · · · |
| · · · | · · · | · · · | · · · | · · · | · · · | · · · |

67 → ELECTRONIC-MONEY ID
68 → CHARGE
69 → SETTLE
71 → 547816
72 → 347895
73 → 2547657

INPUT YOUR PASSWORD

＊＊＊＊＊＊

(b)

INPUT VALUE ISSUANCE AMOUNT

¥10,000-

(c)

REMAINING AMOUNT OF VALUE WAS
UPDATED CURRENTLY REMAINING AMOUNT IS:

¥10,500-

INFORMATION PROCESSING APPARATUS

CROSS-REFERENCE TO RELATED APPLICATIONS

This application is a continuation of U.S. application Ser. No. 10/548,477, filed Oct. 31, 2005, which is a U.S. national stage of International Application No. PCT/JP2003/014190, filed Nov. 7, 2003, which claims priority to Japanese Application No. 2003-61943, filed Mar. 7, 2003, the disclosures of which are hereby incorporated herein by reference.

TECHNICAL FIELD

The present invention relates to a portable terminal device or the like, such as a portable telephone having an electronic money handling function.

BACKGROUND ART

Recently, demonstrative experiments for disbursement systems using electronic money have been successfully completed, thereby leading to a step of practical use of electronic money.

Presently, there are being conducted disbursement therefor and the like in retail stores, and there are being further conducted various endeavors including development of elemental technology, establishment of business model, and the like for widespread use of electronic money among general users.

In addition to usage in retail stores, there are being practically used those systems configured to settle up fares for trains or buses by virtue of functions of electronic money.

Electronic money is configured to be utilized by storing an exchangeable value, which is equivalent to money and is called "VALUE", in an electronic money card, and by using the electronic money card as an electronic wallet.

The VALUE can be entered into an electronic money card by a specific terminal device (hereinafter called "electronic money terminal"). This entering procedure of VALUE is called "charge".

Upon charging VALUE, collected from a user is an amount of money corresponding to the VALUE. This causes the VALUE to correspond to an actual amount of money, thereby guaranteeing the exchangeable value of the VALUE.

Further, disbursement by VALUE is conducted by subtracting an amount of VALUE corresponding to a disbursement Price from an electronic money card through an electronic money terminal.

Electronic money cards can be each configured with a non-contact type IC (integrated circuit) card or a contact type IC card.

In case of an electronic money card configured with a non-contact type IC card, the latter is configured with: an IC chip having a VALUE handling function and a VALUE storage function; and an antenna configured to communicate with an electronic money terminal. In addition to usage for wireless communications with the electronic money terminal, the antenna also has a function for generating electric power for receiving radio waves from the electronic money terminal and for driving the IC chip.

The electronic money terminal is capable of wirelessly communicating with the IC chip within the electronic money card through the antenna to thereby access to the IC chip, thereby conducting various procedures (entering procedure, subtraction procedure, remaining amount reference procedure, and the like) for VALUE.

Main utilization types of electronic money cards are classified as follows:

(1) In case of charging VALUE

Firstly, there is set an electronic money card into an electronic money terminal in a store having the electronic money terminal installed therein, and it is asked for a person responsible for the electronic money terminal to enter VALUE into the electronic money card. At this time, there is paid an amount of money corresponding to the entered VALUE.

Next, the responsible person operates the electronic money terminal to enter the VALUE corresponding to the paid money, into the electronic money card.

This causes the electronic money terminal to transmit an entering command for adding an amount of VALUE corresponding to the paid money, toward the IC chip in the electronic money card.

In turn, the IC chip receives the entering command and executes it, to thereby add an amount of VALUE corresponding to the paid money to the VALUE stored in the IC chip.

In this way, it is possible to charge an amount of VALUE into an electronic money card.

Note that there exists an unmanned electronic money terminal configured to automatically conduct a charge upon insertion of money after setting an electronic money card into the electronic money terminal.

(2) In case of disbursement by VALUE

There is firstly pointed out a commodity or service subject to disbursement, to a person responsible for an electronic money terminal. Then, there is set an electronic money card into the electronic money terminal installed in a store, and it is stated to the responsible person that disbursement is to be conducted by VALUE.

In turn, the responsible person operates the electronic money terminal so as to subtract an amount of VALUE corresponding to the disbursing amount of money from the VALUE stored in the electronic money card.

Then, the electronic money terminal transmits: a subtraction command for subtracting an amount of VALUE corresponding to the amount of money to the IC chip in the electronic money card.

The IC chip receives and executes the subtraction command, thereby subtracting an amount of VALUE corresponding to the disbursing amount of money, from the VALUE stored in the IC chip.

In this way, it is possible to conduct disbursement by means of VALUE in an electronic money card.

Note that there exists an example to provide a vending machine with an electronic money terminal in a manner to automatically conduct disbursement by VALUE upon purchase of a commodity by a user.

(3) In case of utilization of electronic money on Internet

It is possible to charge an amount of VALUE into an electronic money card and/or to conduct disbursement by VALUE stored in an electronic money card, by using a terminal device having an Internet connection function and having a reader/writer configured to conduct reading and entering for the electronic money card.

In case of charging VALUE, the electronic money card is set in the reader/writer, and the terminal device is connected to a site for conducting the charge at the terminal device. This leads to communications between a server apparatus and the electronic money card, so that the server apparatus is allowed to conduct a procedure for entering an amount of VALUE into the electronic money card. The amount of money corresponding to the entered amount of VALUE is withdrawn from a bank account of the user or dealt with by a credit card.

In case of disbursement by VALUE, there is similarly conducted communications between the server apparatus and the electronic money card, thereby achieving a subtraction procedure of VALUE.

In this way, electronic money cards are utilizable as electronic wallets of a prepaid type, and are particularly useful in disbursement of smaller amounts of money since users are not annoyed at handling of small coins.

Further, recently remarkable widespread use of portable telephones has led to an attempt to provide them with functions equivalent to those of electronic money cards.

Providing portable telephones with functions of electronic money cards allows users to charge amounts of VALUE into portable telephones, and/or to conduct disbursement procedures by VALUE stored in the portable telephones.

Examples of a technique for providing a portable telephone with a function of an electronic money card include the following:

[Patent literature 1] JP-A-2002-352173

The invention disclosed therein is configured to provide a portable telephone with a specific memory for storing therein VALUE, so as to charge an amount of VALUE into the specific memory, and so as to exemplarily conduct a disbursement procedure by the VALUE stored therein.

DISCLOSURE OF THE INVENTION

However, in case of charge of VALUE, users have been obliged to go to a place where an electronic money terminal is installed, thereby occasionally causing burdens to the users.

Also, in case of downloading VALUE from a server via Internet, it is required to provide a terminal connectable to the Internet and to provide the terminal with a reader/writer, thereby occasionally causing burdens to the users.

It is therefore an object of the present invention to provide a portable terminal device for facilitated handling of VALUE.

To achieve the above object, the present invention provides a portable terminal device, characterized in that the portable terminal device comprises: currency information storage means for storing therein currency information representing a currency value amount as an electronic data; information processing means for using operational processing information to thereby operationally process the monetary amount of the stored currency information; request information transmission means for transmitting, to a server apparatus, request information for requesting the server apparatus for the operational processing information; processed information receipt means for receiving the operational processing information transmitted by the server apparatus in response to the transmitted request information; and input means for inputting the received operational processing information into the information processing means.

The portable terminal device is further characterized in that the portable terminal device further comprises: monetary amount setting means for setting a monetary amount to be added, based on the operational processing information to be requested by the request information; monetary amount specifying information transmission means for transmitting monetary amount specifying information for specifying the set monetary amount, to the server apparatus; and that the processed information receipt means receives the operational processing information from the server apparatus, the operational processing information being configured to add the monetary amount specified by the transmitted monetary amount specifying information, to the currency information stored in the currency information storage means.

The portable terminal device is further characterized in that the portable terminal device further comprises wireless communications means for connecting, via wireless communications, with a network connected to the server apparatus.

The invention according to the foregoing embodiments is characterized in that the portable terminal device further comprises wireless communications means for connecting, via wireless communications, with a network connected to the server apparatus.

The invention according to the foregoing embodiments is further characterized in that the information processing means is provided with wireless input means for inputting thereinto the operational processing information to be transmitted by wireless communication.

The invention is further characterized in that the portable terminal device further comprises: wireless output means for wirelessly communicating with a currency information handling device comprising: currency information storage means for storing therein currency information representing a currency value amount as an electronic data; information processing means for using operational processing information to thereby operationally process the monetary amount of the stored currency information; and wireless input means for inputting the operational processing information into the information processing means by wireless communication to thereby output an operational processing information for conducting an addition procedure to the wireless input means; and subtraction means for subtracting the monetary amount to be added by the information processing means of the currency information handling device based on the outputted operational processing information from the currency information stored in the currency information storage means of the portable terminal device.

The invention is further characterized in that the portable terminal device further comprises wireless output means for wirelessly communicating with a currency information handling device comprising: currency information storage means for storing therein currency information representing a currency value amount as an electronic data; information processing means for using operational processing information to thereby operationally process the monetary amount of the stored currency information; and wireless input means for inputting the operational processing information into the information processing means by wireless communication to thereby output an operational processing information for conducting a subtraction procedure to the wireless input means; and addition means for adding the monetary amount to be subtracted by the information processing means of the currency information handling device based on the outputted operational processing information to the currency information stored in the currency information storage means of the portable terminal device.

The invention further provides a portable terminal oriented method in a computer comprising currency information storage means, information processing means, request information transmission means, processed information receipt means, and input means, characterized in that the method is configured with: a currency information storage step for causing the currency information storage means to store therein currency information representing a currency value amount as an electronic data; an information processing step for causing the information processing means to use operational processing information to thereby operationally process the monetary amount of the stored currency information; a request information transmission step for causing the request information transmission means to transmit, to a server apparatus, request information for requesting the server apparatus for the operational processing information; a processed information receipt step for causing the processed information receipt means to receive the operational processing information transmitted by the server apparatus in response to the transmitted request information; and an input step for causing the input means to input the received operational processing information into the information processing means.

The invention further provides a portable terminal oriented program for realizing, in a computer: a currency information storage function for storing therein currency information representing a currency value amount as an electronic data; an information processing function for using operational processing information to thereby operationally process the monetary amount of the stored currency information; a request information transmission function for transmitting, to a server apparatus, request information for requesting the server apparatus for the operational processing information; a processed information receipt function for receiving the operational processing information transmitted by the server apparatus in response to the transmitted request information; and an input function for inputting the received operational processing information into the information processing function.

The invention further provides a portable terminal oriented method in a computer comprising: currency information storage means for storing therein currency information representing a currency value amount as an electronic data; wireless output means; and subtraction means; characterized in that the method is configured with: a wireless output step for causing the wireless output means to wirelessly communicate with a currency information handling device comprising currency information storage means for storing therein currency information, information processing means for using operational processing information to thereby operationally process the monetary amount of the stored currency information, and wireless input means for inputting the operational processing information into the information processing means by wireless communication to thereby cause the wireless output means to output the operational processing information for conducting an addition procedure to the wireless input means; and a subtraction step for causing the subtraction means to subtract the monetary amount to be added by the processing means of the currency information handling device based on the outputted operational processing information from the currency information stored in the currency information storage means of the computer.

The invention further provides a portable terminal oriented program for realizing, in a computer comprising currency information storage means for storing therein currency information representing a currency value amount as an electronic data, a wireless output function for wirelessly communicating with a currency information handling device comprising currency information storage means for storing therein currency information, information processing means for using operational processing information to thereby operationally process the monetary amount of the stored currency information, and wireless input means for inputting the operational processing information into the information processing means by wireless communication to thereby output an operational processing information for conducting an addition procedure to the wireless input means; and a subtraction function for subtracting the monetary amount to be added by the information processing means of the currency information handling device based on the outputted operational processing information from the currency information stored in the currency information storage means of the computer.

The invention further provides a portable terminal oriented method in a computer comprising: currency information storage means for storing therein currency information representing a currency value amount as an electronic data; wireless output means; and addition means; characterized in that the method is configured with: a wireless output step for causing the wireless output means to wirelessly communicate with a currency information handling device comprising currency information storage means for storing therein currency information, information processing means for using operational processing information to thereby operationally process the monetary amount of the stored currency information, and wireless input means for inputting the operational processing information into the information processing means by wireless communication to thereby cause the wireless output means to output the operational processing information for conducting a subtraction procedure to the wireless input means; and an addition step for causing the addition means to add the monetary amount to be subtracted by the processing means of the currency information handling device based on the outputted operational processing information to the currency information stored in the currency information storage means of the computer.

The invention further provides a portable terminal oriented program for realizing, in a computer comprising currency information storage means for storing therein currency information representing a currency value amount as an electronic data, a wireless output function for wirelessly communicating with a currency information handling device comprising currency information storage means for storing therein currency information representing a currency value amount as an electronic data, information processing means for using operational processing information to thereby operationally process the monetary amount of the stored currency information, and wireless input means for inputting the operational processing information into the information processing means by wireless communications to thereby output an operational processing information for conducting a subtraction procedure to the wireless input means; and an addition function for adding the monetary amount to be subtracted by the information processing means of the currency information handling device based on the outputted operational processing information to the currency information stored in the currency information storage means of the computer.

The invention further provides a currency information issuance server apparatus configured to transmit the operational processing information to the portable terminal device of any one of the foregoing embodiments characterized in that the currency information issuance server apparatus comprises: request information receipt means for receiving the request information from the portable terminal device; and processed information transmission means for using the received request information to thereby transmit operational processing information to the portable terminal device.

The invention further provides a currency information issuance server apparatus configured to transmit the operational processing information to the portable terminal device, characterized in that the currency information issuance server apparatus comprises: request information receipt means for receiving the request information from the portable terminal device; and processed information transmission means for using the received request information to thereby transmit operational processing information to the portable terminal device.

The invention further provides a currency information issuance server apparatus configured to transmit the operational processing information to the portable terminal device, characterized in that the currency information issuance server apparatus comprises: request information receipt means for receiving the request information from the portable terminal device; and processed information transmission means for using the received request information to thereby transmit operational processing information to the portable terminal device.

The invention further provides a currency information issuance server apparatus configured to transmit the operational processing information to the portable terminal device of, characterized in that the currency information issuance server apparatus comprises: request information receipt means for receiving the request information from the portable terminal device; and processed information transmission means for using the received request information to thereby transmit operational processing information to the portable terminal device.

The invention further provides a currency information issuance method in a computer comprising request information receipt means and processed information transmission means, characterized in that the method is configured with: a request information receipt step for causing the request information receipt means to receive the request information from the portable terminal device of any one of the foregoing embodiments; and a processed information transmission step for causing the processed information transmission means to use the received request information to thereby transmit operational processing information to the portable terminal device.

The invention further provides a currency information issuance method in a computer comprising request information receipt means and processed information transmission means, characterized in that the method is configured with: a request information receipt step for causing the request information receipt means to receive the request information from the portable terminal device of; and a processed information transmission step for causing the processed information transmission means to use the received request information to thereby transmit operational processing information to the portable terminal device.

The invention further provides a currency information issuance method in a computer comprising request information receipt means and processed information transmission means, characterized in that the method is configured with: a request information receipt step for causing the request information receipt means to receive the request information from the portable terminal device; and a processed information transmission step for causing the processed information transmission means to use the received request information to thereby transmit operational processing information to the portable terminal device.

The invention further provides a currency information issuance method in a computer comprising request information receipt means and processed information transmission means, characterized in that the method is configured with: a request information receipt step for causing the request information receipt means to receive the request information from the portable terminal device; and a processed information transmission step for causing the processed information transmission means to use the received request information to thereby transmit operational processing information to the portable terminal device.

The invention further provides a currency information issuance program for realizing, in a computer: a request information receipt function for receiving the request information from the portable terminal device; and a processed information transmission function for using the received request information to thereby transmit operational processing information to the portable terminal device.

The invention further provides a currency information issuance program for realizing, in a computer: a request information receipt function for receiving the request information from the portable terminal device; and a processed information transmission function for using the received request information to thereby transmit operational processing information to the portable terminal device.

The invention further provides a currency information issuance program for realizing, in a computer: a request information receipt function for receiving the request information from the portable terminal device; and a processed information transmission function for using the received request information to thereby transmit operational processing information to the portable terminal device.

The invention further provides a currency information issuance program for realizing, in a computer: a request information receipt function for receiving the request information from the portable terminal device; and a processed information transmission function for using the received request information to thereby transmit operational processing information to the portable terminal device.

The invention further provides a portable terminal device characterized in that the portable terminal device comprises: connecting means for connecting with a currency information handling device comprising: currency information storage means for storing therein currency information representing a currency value amount as an electronic data; and information processing means for using operational processing information to thereby operationally process the monetary amount of the stored currency information; request information transmission means for transmitting, to a server apparatus request information for requesting the server apparatus for the operational processing information for conducting an addition procedure; processed information receipt means for receiving the operational processing information transmitted by the server apparatus in response to the transmitted request information; and input means for inputting the received operational processing information into the information processing means of the currency information handling device connected by the connecting means.

The invention further provides a portable terminal device characterized in that the portable terminal device comprises: connecting means for connecting with currency information storage means for storing therein currency information representing a currency value amount as an electronic data; information processing means for using operational processing information to thereby operationally process the monetary amount of currency information stored in the connected currency information storage means; request information transmission means for transmitting, to a server apparatus, request information for requesting the server apparatus for the operational processing information for conducting an addition procedure; processed information receipt means for receiving the operational, processing information transmitted by the server apparatus in response to the transmitted request information; and input means for inputting the received operational processing information into the information processing means.

According to the present invention, it becomes possible to easily handle "VALUE" in a portable terminal device, for example.

BRIEF DESCRIPTION OF THE DRAWINGS

FIG. 6 is a view of an example of a logical configuration of user information.

FIG. 7 is a view of an example of a logical configuration of transactional information.

FIG. 11 is a view for explaining windows for conducting mobile charge.

DETAILED DESCRIPTION OF THE PREFERRED EMBODIMENTS

Figure 1:
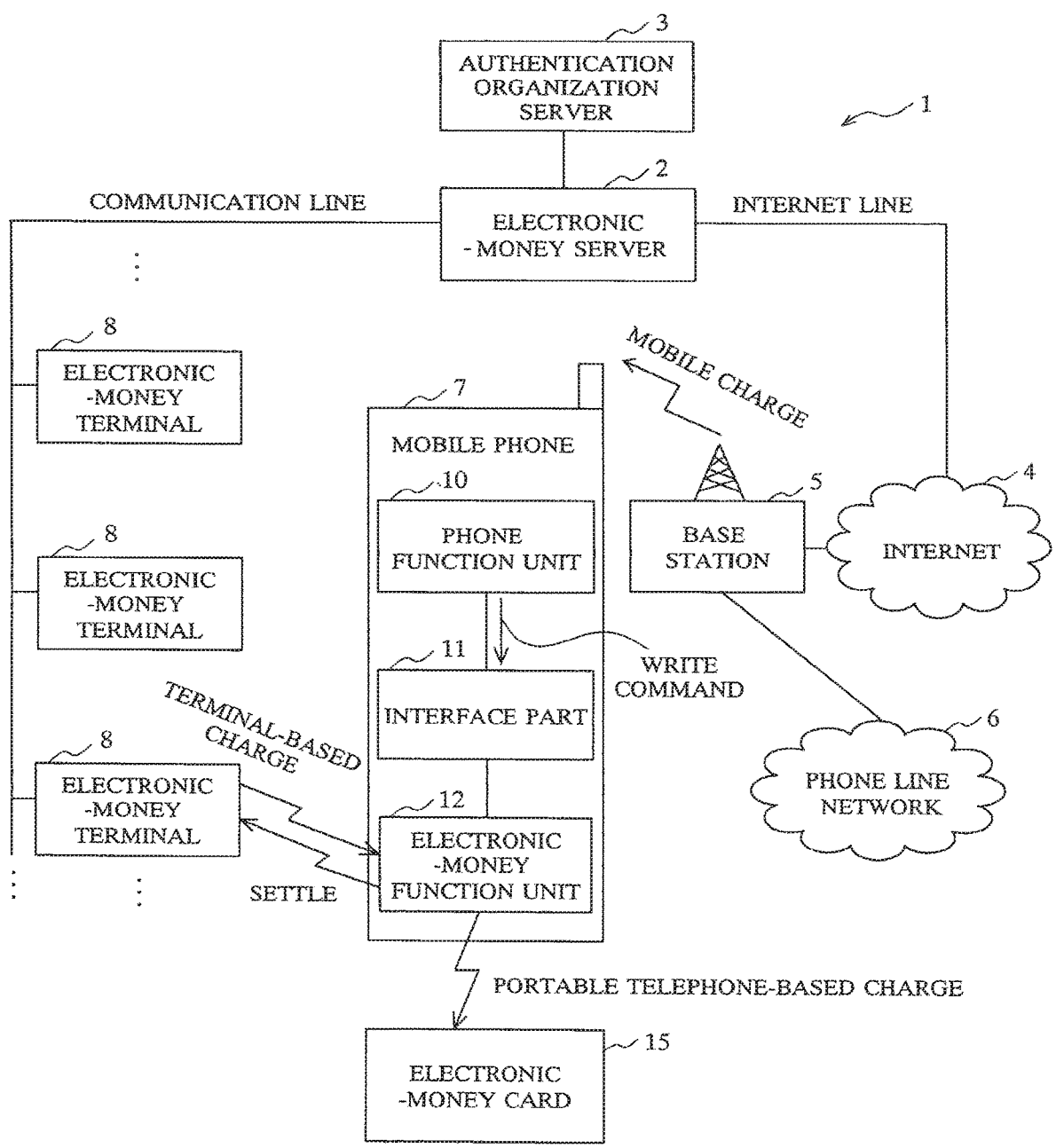
FIG. 1 is a view of an example of a configuration of an electronic money operational system.

There will be detailedly explained preferred embodiments of the present invention.
(1) Outline of Embodiments There is previously provided an IC chip of an electronic money card within a portable telephone connectable to the Internet, and the portable telephone is configured to possess a reader/writer function.

The portable telephone is to be connected to a server apparatus on the Internet and the reader/writer function is operated, thereby enabling an amount of VALUE to be entered into the IC chip.

Further, the portable telephone internally includes an antenna as well for conducting wireless communications between the IC chip and an electronic money terminal, thereby establishing a condition that the electronic money terminal is capable of accessing to the IC chip in the same manner as an electronic money card.

This allows for conduction of charge of VALUE-and disbursement by VALUE in the same manner as an electronic money card, by setting the portable telephone in the electronic money terminal.

The above procedures will be described with reference to FIG. 1, as follows.

Reference numeral 7 designates a portable telephone having a telephone function part 10, an electronic money function part 12, and an interface part 11 configured to interconnect them with each other.

The telephone function part 10 has an Internet connecting function. Further, the electronic money function part 12 is exemplarily configured with an IC chip of electronic money card, and has a VALUE storage function and a VALUE handling function.

The portable telephone 7 is capable of conducting wireless communications between it and a base station 5, and the telephone function part 10 is capable of connecting with an electronic money server 2 via base station 5 and Internet 4.

It is possible to charge an amount of VALUE into the thus configured portable telephone 7, by the following procedures.

(1) User connects the telephone function part 10 to the electronic money server 2, and requests charge of VALUE.

(2) To this request, the electronic money server 2 asks an authentication organization server 3 to issue a permission for VALUE issuance.

(3) The authentication organization server 3 is one operated by a financial institution, and is configured to judge whether or not it is possible to give credit to the user by issuing an amount of VALUE. When it is judged to be possible to give credit, issuance permission of VALUE is given to the electronic money server 2.

(4) Upon receipt of the issuance permission of VALUE, the electronic money server 2 transmits an entering command for entering an amount of VALUE, to the telephone function part 10.

(5) The telephone function part 10 receives the entering command, and inputs it into the electronic money function part 12.

(6) The electronic money function part 12 executes the entering command to thereby conduct an entering procedure of VALUE.

The above procedures allow the portable telephone 7 to be charged with the amount of VALUE.

Meanwhile, in case of subtraction of an amount of VALUE from the portable telephone 7, it is enough to transmit a subtraction command from the electronic money server 2 to the portable telephone 7.

Further, the electronic money function part 12 is also capable of transferring an amount of VALUE stored in the electronic money function part 12 itself toward an electronic money card 15 set at a position near the portable telephone 7 or toward other portable telephone 7, by driving the antenna of the electronic money function part 12 itself by an electric power source of the firstly mentioned portable telephone 7.

Note that although the portable telephone is explained to internally include the IC chip (information processing unit) in this embodiment, the IC chip is configured to be detachable from the portable telephone so that the former may be configured for usage by mounting it on the portable telephone. Alternatively, it is possible to provide the portable telephone with a function part corresponding to a CPU (information processing means) of the IC chip and to provide a detachable function part corresponding to a memory (storage means) of the IC chip.

When the IC chip or memory is made detachable, the portable telephone side is to be provided with a connector (connecting means).

(2) Details of Embodiment

FIG. 1 is a view of an example of a configuration of an electronic money operational system 1 of this embodiment.

The electronic money operational system 1 is configured with: portable telephones 7 each having a function equivalent to that of an electronic money card; the electronic money server 2 configured to exemplarily conduct charge of VALUE into each portable telephone 7; the Internet 4 configured to mediate Internet communications; the base station 5 configured to wirelessly communicate with the portable telephones 7; a telephone network 6 configured to mediate voice communications and facsimile transmission/receipt; electronic money cards 15 each configured with a non-contact type IC card; electronic money terminals 8, 8, 8, . . . each configured to conduct entrance, disbursement, and the like of VALUE for the portable telephones 7 and electronic money cards 15; and the like.

These components will be described hereinafter.

Each portable telephone 7 (portable terminal device) is configured with: a telephone function part 10 having function as a digital telephone having an Internet connecting function; an electronic money function part 12 capable of storing VALUE and handling VALUE, identically to an electronic money card; and an interface part 11 configured to interconnect them with each other.

Note that "VALUE" is currency information representing a currency value amount as an electronic data, and possesses an exchangeable value equivalent to that of money. The VALUE can be utilized for disbursement, by causing transference of values by addingly and subtractingly controlling the currency information.

The telephone function part 10 is capable of wirelessly communicating with the base station 5, and capable of connecting with the Internet 4 or telephone network 6 via base station 5.

In case of using the portable telephone 7 as a telephone, the telephone function part 10 is to be actuated in a voice communications mode to thereby establish a voice communications link between the portable telephone 7 itself and a telephone of a telephone partner via telephone network 6. The partner's telephone of the voice communications is specified by a telephone number inputted by the user. In turn, in case of using the portable telephone 7 as a terminal device for Internet, the telephone function part 10 is actuated in an Internet connecting mode to thereby connect the portable telephone 7 to a target site via Internet 4.

The telephone function part 10 is provided with a browser for exemplarily presenting information transmitted from the server apparatus, and for transmitting information and the like inputted by the user to the server apparatus in a manner to specify a connection target site by a URL (Uniform Resource Locator) inputted by the user.

Figure 2:
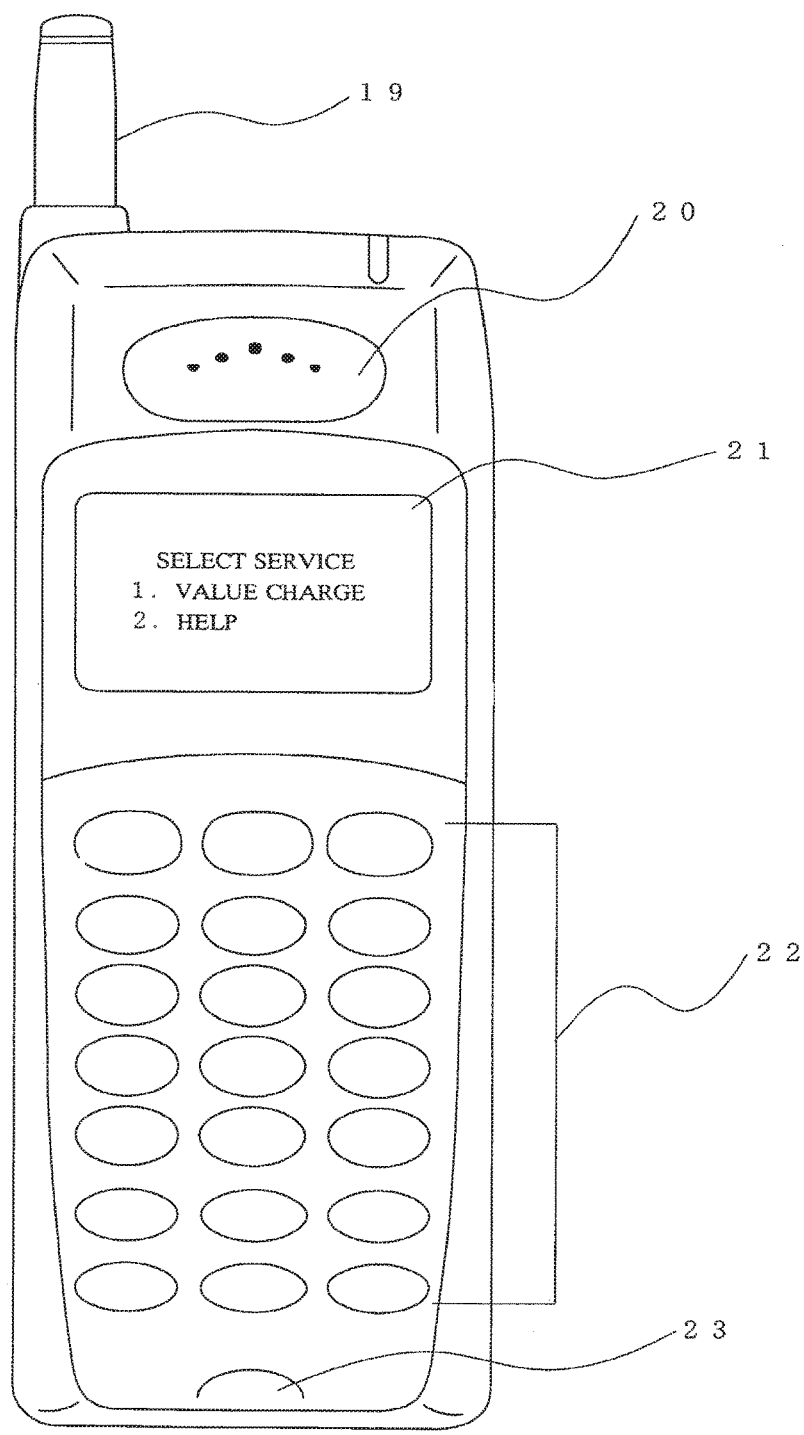
FIG. 2 is a view of an example of external appearance of a portable telephone.

FIG. 2 is a view of an example of external appearance of the portable telephone 7. The portable telephone 7 is provided with a telephone antenna 19, a speaker 20, a display 21, a keyboard 22, and a microphone 23.

The telephone antenna 19 is one for wirelessly communicating with the base station 5.

The speaker 20 is a device for converting electrical signals to generate voices. It outputs voices generated by a telephone partner in the voice communications mode, and reproduces voice data transmitted from the server apparatus in the Internet connecting mode.

The display 21 is a device for displaying characters, images, and the like, and is exemplarily configured with a liquid crystal display or plasma display.

In the voice communications mode, displayed on the display 21 are information relating to voice communications, including a receiving state of radio waves, a telephone number inputted by the user or a telephone number of a telephone partner of voice communications, and the like.

Further, as described later, it is also possible to access to the electronic money function part 12 to cause the display 21 to display a remaining amount, a historical data, and the like of VALUE.

In the Internet connecting mode, the display 21 displays thereon a pictorial window provided by the browser function possessed by the telephone function part 10.

The keyboard 22 is provided with: character keys for inputting character information such as numbers and characters; and functional keys for turning on and off the electric power source of the portable telephone 7, for changing over between the voice communications mode and the Internet connecting mode, for moving a cursor displayed on the display 21, and for clicking a button displayed thereon.

By pushing keys of the keyboard 22, it is exemplarily allowed for a user to conduct various input operations such as input of a URL of the server apparatus, input of information into an input field displayed in a pictorial window, and selection of an item displayed in the pictorial window. Also, it is exemplarily possible to input a URL of a service site of the electronic money server 2; and input required information such as an amount of money corresponding to a monetary amount of VALUE to be charged; (monetary amount setting means).

The microphone 23 is a device for catching voices and converting them into electrical signals. The user is allowed to input voices through the microphone 23.

There will be explained a function to be used for connecting with the electronic money server 2 to thereby charge an amount of VALUE, among various functions possessed by the portable telephone 7.

Figure 3:
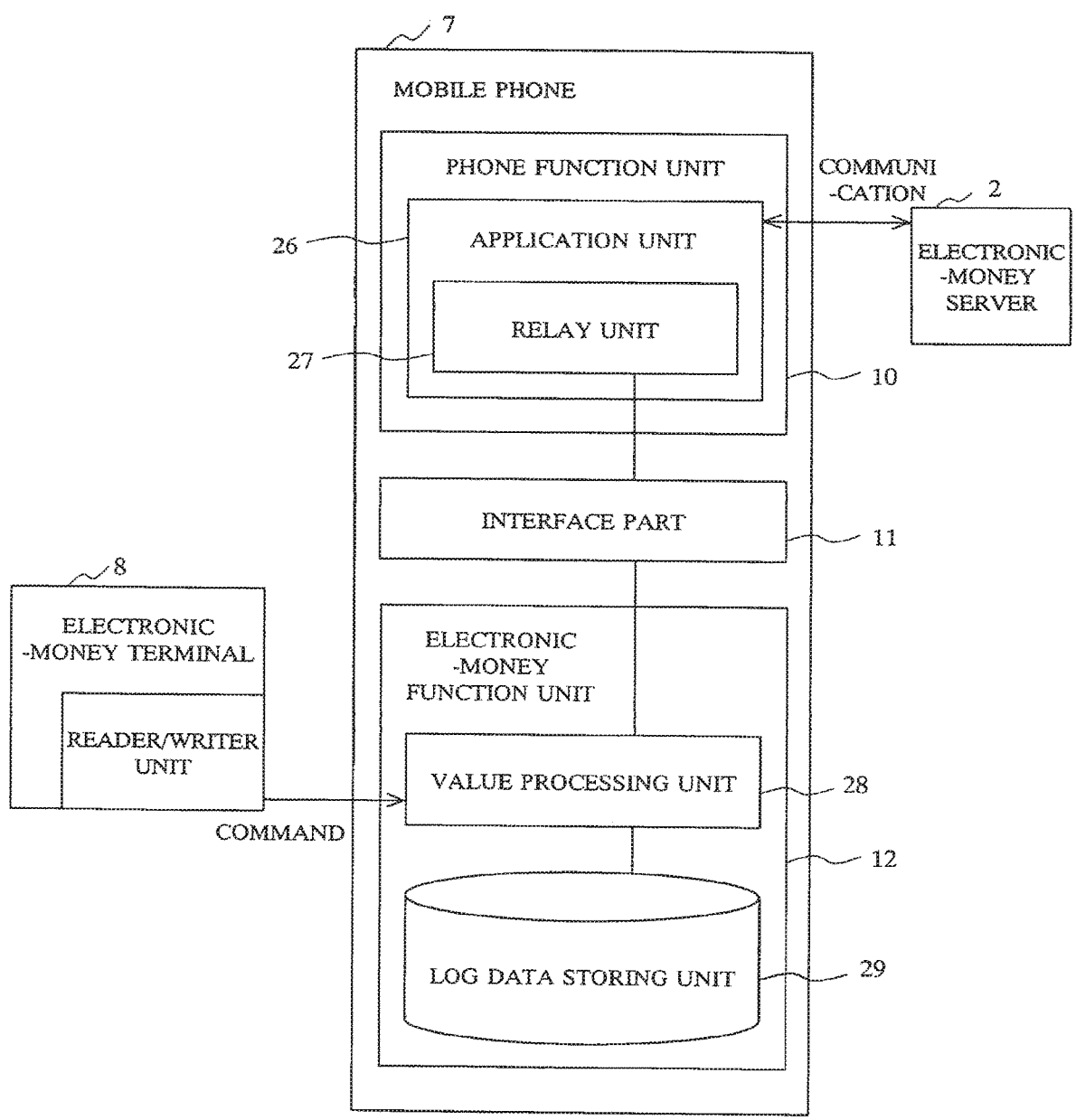
FIG. 3 is a view for explaining a function of the portable telephone.

FIG. 3 is a view of a functional configuration of the portable telephone 7. As described later, the telephone function part 10 and electronic money function part 12 are provided with CPU's (central processing unit), respectively, and these CPU's execute predetermined programs to thereby constitute by software the function parts, respectively.

As shown in FIG. 3, the telephone function part 10 is provided with an application part 26 and a relay part 27, and the electronic money function part 12 is provided with a VALUE handling part 28 and a log data storage part 29.

The log data storage part 29 (currency information storage means) is a function part configured to store therein a log data concerning VALUE. This log data is historical data information for recording details of VALUE handling such as entrance, subtraction, and remaining amount reference of VALUE. By referring to the log data, it becomes possible to know a currently remaining amount of VALUE stored in the portable telephone 7, the historical data of VALUE handling, and the like.

The details to be recorded as the log data include those information on: a time and date where handling is conducted; a type of handling; a changed value (such as an entered monetary amount of VALUE when an amount of VALUE is entered; or a subtracted monetary amount of VALUE when an amount of VALUE is subtracted) where a monetary amount of VALUE is changed by handling; a terminal ID of an electronic money terminal 8 when an amount of VALUE is handled by accessing to the electronic money terminal 8; a currently remaining amount of VALUE;

an affiliated store ID for specifying an affiliated store having an electronic money terminal 8 installed therein; and the like.

The VALUE handling part 28 (information processing means) is a function part configured to conduct information processing specified by a VALUE handling command (operational processing information) upon input thereof.

The command for operating the VALUE handling part 28 can be inputted from the relay part 27 of the telephone function part 10 through the interface part 11, or from a reader/writer, part of an electronic money terminal 8 by wireless communications.

Note that the VALUE handling part 28 is provided with an antenna (hereinafter called "terminal antenna") equivalent to that of an electronic money card so as to conduct wireless communications with an electronic money terminal 8, and bringing the portable telephone 7 closer to a reader/writer part of the electronic money terminal 8, allows for conduction of wireless communications with the electronic money terminal 8 in the same manner as a typical non-contact type electronic money card.

Examples of commands to be executed by the VALUE handling part 28 include: an entering command for entering an amount of VALUE; a subtraction command for subtracting an amount of VALUE; and a remaining amount query command for conducting a query about a remaining amount of VALUE.

The entering command (addition handling information) may be accompanied by a monetary amount of VALUE to be entered, as a parameter of the command. Inputting the entering command into the VALUE handling part 28, causes the VALUE handling part 28 to update the log data in the log data storage part 29 to thereby conduct an addition procedure for adding the monetary amount of VALUE specified by the parameter, to the currently remaining amount of VALUE. Execution of the addition procedure allows for charge of VALUE.

The subtraction command (subtraction procedure information) may be accompanied by a monetary amount of VALUE to be subtracted, as a parameter of the command. Inputting the subtraction command into the VALUE handling part 28, causes the VALUE handling part 28 to update the log data in the log data storage part 29 to thereby conduct a subtraction procedure for subtracting the monetary amount of VALUE specified by the parameter, from the currently remaining amount of VALUE. Execution of the subtraction procedure allows for conducting disbursement (payment) by VALUE.

In addition to the monetary amount, the latter parameter may be accompanied by other information such as: an affiliated store ID of an affiliated store for which the user is to conduct the disbursement; a commodity ID; and a time and date of the disbursement.

The remaining amount reference command (remaining amount reference procedure information) is one for obtaining a currently remaining amount of VALUE, end inputting the remaining amount reference command into the VALUE handling part 28 causes it to retrieve a log data in the log data storage part 29 and to return a currently remaining amount of VALUE.

Displaying the currently remaining amount returned by the VALUE handling part 28 on the display 21, allows a user to be informed of the currently remaining amount.

Other various commands are prepared for operating the VALUE handling part 28; and exemplarily include: a command for reading a chip ID as unique information provided upon manufacture of the IC chip constituting the electronic money function part 12; and a command for reading an electronic money ID as unique information assigned to the electronic money function part 12 by the electronic money server 2.

It is also possible to combine an entering command with a subtraction command to thereby transfer an amount of VALUE stored in the log data storage part 29 toward an electronic money card 15 or other portable telephone 7, as described later.

The interface part 11 is a function part configured to relay communications to be conducted between the telephone function part 10 and electronic money function part 12. In relaying communications between the telephone function part 10 and electronic money function part 12, the interface part 11 is exemplarily capable of encrypting data transmitted from the electronic money function part 12 to the telephone function part 10, and capable of decrypting an encrypted data transmitted from the telephone function part 10 to the electronic money function part 12.

This is to enhance security, by encrypting the data to be transmitted to and received from the electronic money server 2 by the telephone function part 10.

The relay part 27 (input means) is a function part for the application part 26 to access to the electronic money function part 12.

It is also possible to establish a communications link between the electronic money server 2 and the application part 26, and to cause the application part 26 to conduct an intermediary handling between the electronic money server 2 and the relay part 27, thereby allowing utilization of the relay part 27 by the electronic money server 2, as described later.

Namely, through the application part 26, it is exemplarily possible to input a command transmitted from the electronic money server 2 into the VALUE handling part 28, and to return data outputted from the VALUE handling part 28 to the electronic money server 2.

At this time, the relay part 27 exemplarily possesses a function: for extracting those information, which are to be transmitted to the electronic money function part 12, from information transmitted from the electronic money server 2; and for delivering the extracted information to the electronic money function part 12.

Thus, the relay part 27 cooperates with the interface part 11, as a function part for the VALUE handling part 28, in the same manner as a reader/writer part of an electronic money terminal 8.

The application part 26 is a function part configured to provide various applications in the portable telephone 7. Examples of functions to be provided by the application part 26 include: a browser function for connecting with the Internet 4 thereby utilizing services provided by the server apparatus; a transmission/receipt function for electronic mails; a calendar function, and a game function utilizable in an off line manner; and a reader/writer part driving function for driving the relay part 27 to thereby access to the electronic money function part 12.

Examples of VALUE handling procedures to be conducted by the application part 26 by driving the relay part 27, include a VALUE entering procedure, a VALUE remaining amount querying procedure, a VALUE subtraction procedure, and a VALUE transference procedure:

While details will be described later, the VALUE entering procedure is conducted when the application part 26 has received an entering command from the electronic money server 2, and then the entering command is inputted into the VALUE handling part 28 via relay part 27. The VALUE handling part 28 is configured to execute the inputted entering command to thereby conduct an addition procedure (charge) of VALUE.

The entering command can be transmitted from the electronic money server 2, by connecting the application part 26 to the service site of the electronic money server 2, and by requesting the electronic money server 2 to transmit the entering command. At this time, it is possible for a user to set an amount of money to be entered.

The VALUE remaining amount querying procedure can be conducted in an off line manner, such that the application part 26 is to input a remaining amount query command into the VALUE handling part 28 via relay part 27. In response to the input of the remaining amount query command, the VALUE handling part 28 returns a currently remaining amount of VALUE, and the application part 26 displays it on the display 21.

This allows the user to confirm the remaining amount of VALUE currently stored in the portable telephone 7.

The VALUE subtraction procedure is to conduct a subtraction procedure of an amount of VALUE, by causing the VALUE handling part 28 to execute a subtraction command transmitted from the electronic money server 2 when the user conducts disbursement by the VALUE stored in the electronic money function part 12.

The VALUE transference procedure is to conduct a transferring procedure for transferring the VALUE stored in the log data storage part 29 by a specified amount of money toward an electronic money card 15 or another portable telephone 7. The transferring procedure can be realized by combining an addition procedure with a subtraction procedure.

In this case, the application part 26 is to cause the VALUE handling part 28 to exhibit a function as a reader/writer; thereby entering the amount of VALUE stored in the log data storage part 29, into an electronic money card 15 or another portable telephone 7 through the terminal antenna.

In the above, although the explanation has been made for a situation for using the telephone function part 10 to cause the electronic money function part 12 to conduct the VALUE handling, it is also possible to set the portable telephone 7 into an electronic money terminal 8 in the same manner as an electronic money card 15 and to utilize the electronic money terminal 8 to conduct handling of the VALUE in the electronic money function part 12.

In this case, the electronic money function part 12 operates in the same manner as an electronic money card 15, such that the electronic money terminal 8 inputs an entering command into the electronic money function part 12 in case of charging an amount of VALUE into the VALUE handling part 28, while the electronic money terminal 8 inputs a subtraction command into the VALUE handling part 28 in case of disbursement by VALUE.

In this way, there are two kinds of ways for charging the electronic money function part 12, and the charging procedure from the electronic money server 2 via Internet 4 is called "mobile charge" and the charging procedure from an electronic money terminal 8 is called "terminal-based charge" hereinafter.

Further; the procedure for entering an amount of VALUE from the portable telephone 7 into an electronic money card 15 or another portable telephone 7, is called "portable telephone-based charge".

Figure 4:
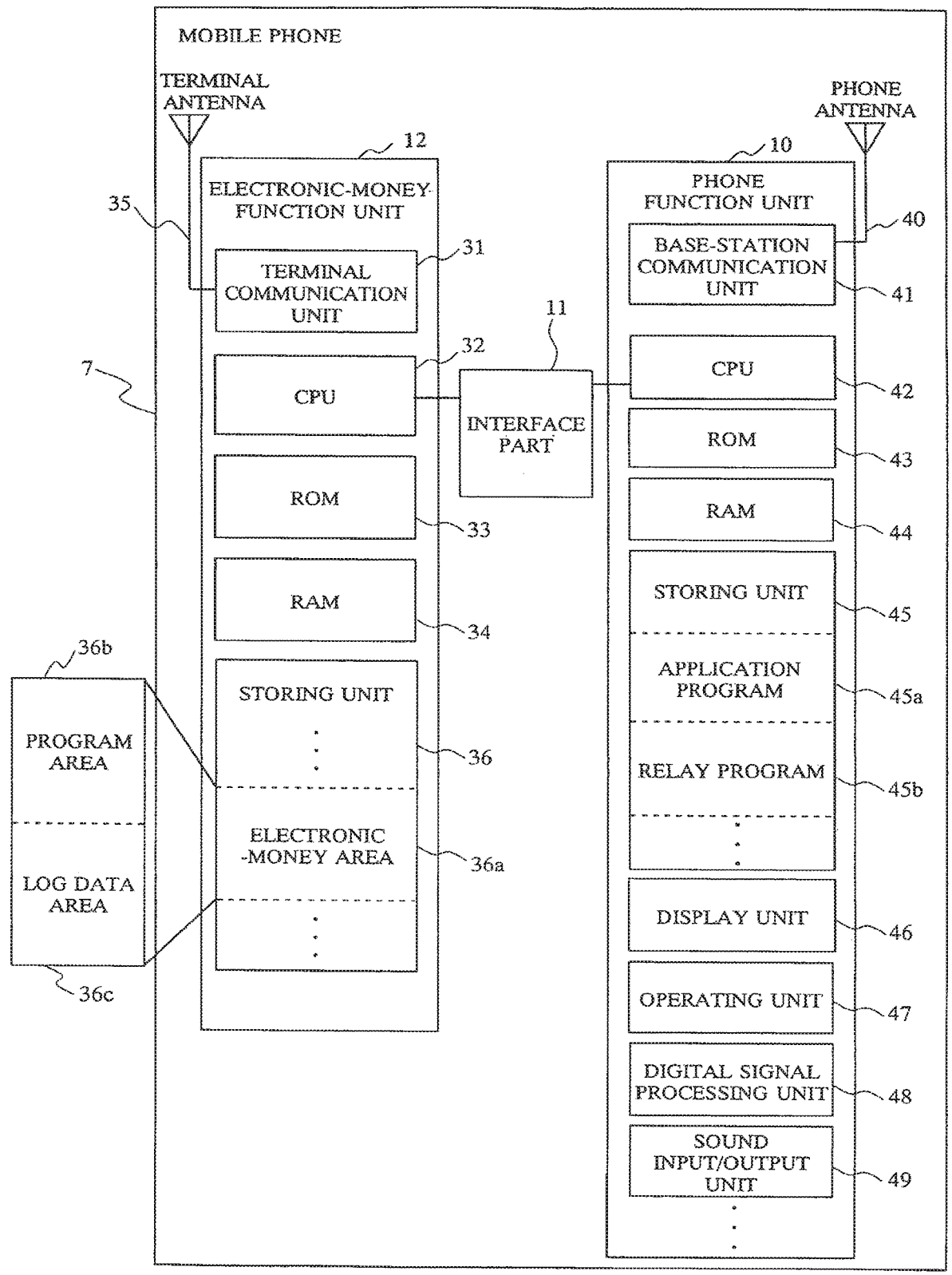
FIG. 4 is a view for explaining an example of a hardware wise configuration of the portable telephone.

There will be explained an example of hardware-wise configuration of the portable telephone 7, with reference to FIG. 4.

The telephone function part 10 is a part constituting a digital portable telephone possessing a function for connecting with the. Internet 4, and is configured with a telephone antenna 40, a base station communication part 41, a CPU 42, a ROM (Read Only Memory) 43, a RAM (Random Access Memory) 44, a storage part 45, a display part 46, a manipulation part 47, a digital signal processing part 48, a voice input/output part 49, and the like.

The telephone antenna 40 is configured to exemplarily emit radio waves to the base station 5, and to absorb radio waves emitted from an antenna of the base station 5. This allows the portable telephone 7 to wirelessly communicate with the base station 5, to conduct voice communications by telephone via base station 5, and to conduct connection to the Internet 4.

The base station communication part 41 (wireless communications means, request information transmission means, and processed information receipt means) is a function part for driving the telephone antenna 40, and is exemplarily configured to: amplify a signal to be transmitted from the telephone antenna 40; and amplify a signal received from the base station 5 to provide it to the CPU 42.

The CPU 42 is a central processing unit configured to execute predetermined programs to thereby conduct various information processing, and is capable of causing the telephone function part 10 to exhibit a function as a portable telephone having an Internet connecting function.

The CPU 42 functions as a telephone or as a terminal for the Internet 4, by executing programs stored in the ROM 43 RAM 44, or storage part 45. Further, the same is also capable of accessing to the electronic money function part 12 via interface part 11, thereby realizing a reader/writer function for reading and writing data.

The ROM 43 is a read only memory provided to be readable by the CPU 42, and stores programs and parameters in itself to be executed by the CPU 42.

The ROM 43 is stored with an OS (operating system), for example, which is a basic program for an operation of the CPU 42.

The RAM 44 is a readable and writable memory configured to provide a working area to the CPU 42 during operation thereof.

The storage part 45 is stored with programs, data, and the like to be utilized by the CPU 42. The storage part 45 is a memory readable and writable by the CPU 42, and a flash memory is utilized therefor, for example.

In this embodiment, the storage part 45 is stored with: an application program 45a for causing the CPU 42 to realize an application function; and a relay program 45b for causing the CPU 42 to exhibit a reader/writer function.

Execution of the application program 45a by the CPU 42 constitutes by software the application part 26 (FIG. 3), and execution of the relay program 45b by the CPU 42 constitutes by software the relay part 27.

Note that although not shown, the storage part 45 is additionally stored with telephone numbers, electronic mail addresses entered by a user, a kana-kanji conversion program, and other information.

The display part 46 is a function part configured to display character information; images, and the like on the display 21 (FIG. 2).

In the voice communications mode, the display part 46 selectably displays thereon a list of telephone numbers entered by a user, and displays thereon those information to be used for voice communications, such as a strength level of radio waves transmitted from the base station 5, a telephone number inputted by the user, or a telephone number of a telephone of a telephone partner who has called the user.

In the Internet connecting mode, the display part displays a browser window or the like provided by the application program 45a, thereby displaying an input field of a URL, a pictorial window transmitted from the server apparatus, electronic mails, or the like. The display part is also capable of displaying a remaining amount of VALUE:

The manipulation part 47 is provided with the keyboard 22, and converts user's key inputs into electrical signals and input them into the CPU 42.

The voice input/output part 49 is provided with the microphone 23 and speaker 20, and is exemplarily configured to convert a voice received by the microphone 23 into an analog signal and to convert an analog signal into a voice to thereby output it from the speaker 20.

It is allowed for a user to convert own voice into an electrical signal through the microphone and input it into the telephone function part 10, and to convert a voice signal outputted from the telephone function part 10 into a voice and to listen to it from the speaker.

The digital signal processing part 48 is a function part configured to rapidly convert a voice data from an analog signal into a digital signal, or rapidly convert it from a digital signal into an analog signal, and is configured with a DSP (Digital Signal Processor), for example. Further, it also conducts compression and decompression of voice data.

While the microphone and speaker utilize analog signals, respectively, the telephone function part 10 and other function parts utilize digital signals, respectively. As such, in case of input of voice signals, the digital signal processing part 48 converts analog signals outputted from the microphone into digital signals and further Compress them, and in case of output of voice signals, the digital signal processing part decompresses and converts digital signals outputted from the telephone, function part 10 into analog signals and outputs them to the speaker.

Meanwhile, the electronic money function part 12 is configured with an antenna 35, a terminal communication part 31, a CPU 32, a ROM 33, a RAM 34, a storage part 36, and the like. Among them, the components except for the antenna 35 are accommodated in a single IC chip.

The antenna 35 communicates with an antenna provided at a reader/writer part of an electronic money terminal 8, by radio waves. Further, in case of portable telephone based charge, it conducts transmission/receipt of radio waves to/from a cooperative electronic money card 15 or an antenna of another portable telephone 7 of a telephone partner.

The terminal communication part 31 (wireless input means) is exemplarily configured to drive the antenna 35, and to amplify transmission/receipt signals.

The CPU 32 is a central processing unit configured to execute programs stored in the ROM 33, RAM 34, storage part 36, and the like to thereby conduct VALUE handling such as charge, disbursement, remaining amount query; and transference of VALUE, and is connected to the CPU 42 via interface, part 11.

The ROM 33 is a read only memory disposed to be readable by the CPU 32. The ROM 33 is Stored with an OS, for example, which is a basic program for an operation of the CPU 32.

Further, at the time of manufacture of IC chips, IC chip ID's unique to the IC chips are assigned thereto, respectively, and such an IC chip ID is also stored in the ROM 33.

The RAM 34 is a readable and writable memory configured to provide a working area to the CPU 32 during operation thereof.

The storage part 36 is a storage medium configured with a flash memory, for example, and configured to be readable and writable by the CPU 32. The storage part 36 reserves therein an electronic money area 36a for conduction of VALUE management.

The electronic money area 36a is further formed with an electronic money area 36b configured to store a program therein; and a log data area 36c configured to store a log data therein.

The program area 36b is stored with a VALUE handling program for causing the CPU 32 to conduct VALUE handling. Execution of the VALUE handling program by the CPU 32 constitutes by software the VALUE handling part 28 (FIG. 3).

Meanwhile, when the user is to receive a service by electronic money by the portable telephone 7, the user is supposed to conduct user registration with the electronic money server 2.

The user registration with the electronic money server 2 assigns a unique electronic money ID to the portable telephone 7, and also this electronic money ID is stored in the program area 36b.

The log data area 36c is stored with a log data concerning VALUE, which constitutes the log data storage part 29 (FIG. 3).

As described above, the portable telephone 7 possesses a VALUE handling function as well, so that the user is capable of not only conducting charge of VALUE by setting the portable telephone 7 into an electronic money terminal 8, but also conducting charge of VALUE from the electronic money server 2 via Internet.4.

In case of VALUE charge via Internet 4, communications between the base station 5 and the portable telephone 7 are wirelessly conducted, so that the user is allowed to conduct VALUE charge without being bound by time and place.

Thus, in case of settling up a fare of taxi or bus by VALUE, for example, it is even possible at the time of settling up to charge an amount of VALUE from the electronic money server 2 and to subsequently conduct payment.

There will be now explained the Internet 4, base station 5, and telephone network 6 (FIG. 1).

The Internet 4 is connected with various server apparatuses and terminals, and communications can be conducted therethrough by using a TCP/IP (Transmission Control Protocol/Internet Protocol) and other protocols.

Although not shown the Internet 4 is connected with various server apparatuses in which Web sites are opened to provide various services. Further, these sites can be specified by URL's thereof, respectively.

Users of the Internet 4 are each allowed to connect with an intended Web site by inputting its URL from a terminal such as a personal computer, thereby utilizing a service provided by the Web site.

In this embodiment, the URL of the Web site of the electronic money server 2 is inputted from the portable telephone 7 to access to the electronic money server 2, thereby conducting VALUE charge.

The base station 5 wirelessly communicates with each portable telephone 7, and provides a user of the portable telephone 7 with voice communications service or Internet connection service.

The base station 5 is configured: to connect a communications line to the telephone network 6 to thereby allow for voice communications, when the user has connected to the base station in the voice communications mode; and to connect the communications line to the Internet 4 to thereby allow for utilization of a service provided by any intended Web server, when the user has connected to the base station in the Internet connecting mode.

Opened on the Internet 4 are various Web sites utilizable from portable telephones 7. Examples of such Web sites include: that for conducting the mobile charge according to this embodiment; and those for providing games, shopping information; movie information, search of restaurants, chats, electronic mails, and the like.

The base station 5 is provided with a converter configured to mutually convert a protocol to be used by each portable telephone 7 and a protocol to be used by the Internet 4, so that each portable telephone 7 is allowed to connect with the Internet 4 through the converter.

The telephone network 6 is a so-called public network configured to establish voice communications lines among telephones. Input of a telephone number of a telephone partner from a portable telephone 7 by its user, establishes communications with the telephone of the partner via telephone network 6, thereby enabling conduction of voice communications.

Further, although FIG. 1 shows the Internet 4 and the telephone network 6 separately from each other, this differentiation is conducted from a functional standpoint, and it is possible to physically constitute them of a common transmission medium.

Usable examples of such a transmission medium include various cables, optical fibers, and communication lines via artificial satellite.

There will be explained the electronic money server 2 (FIG. 1).

Figure 5:
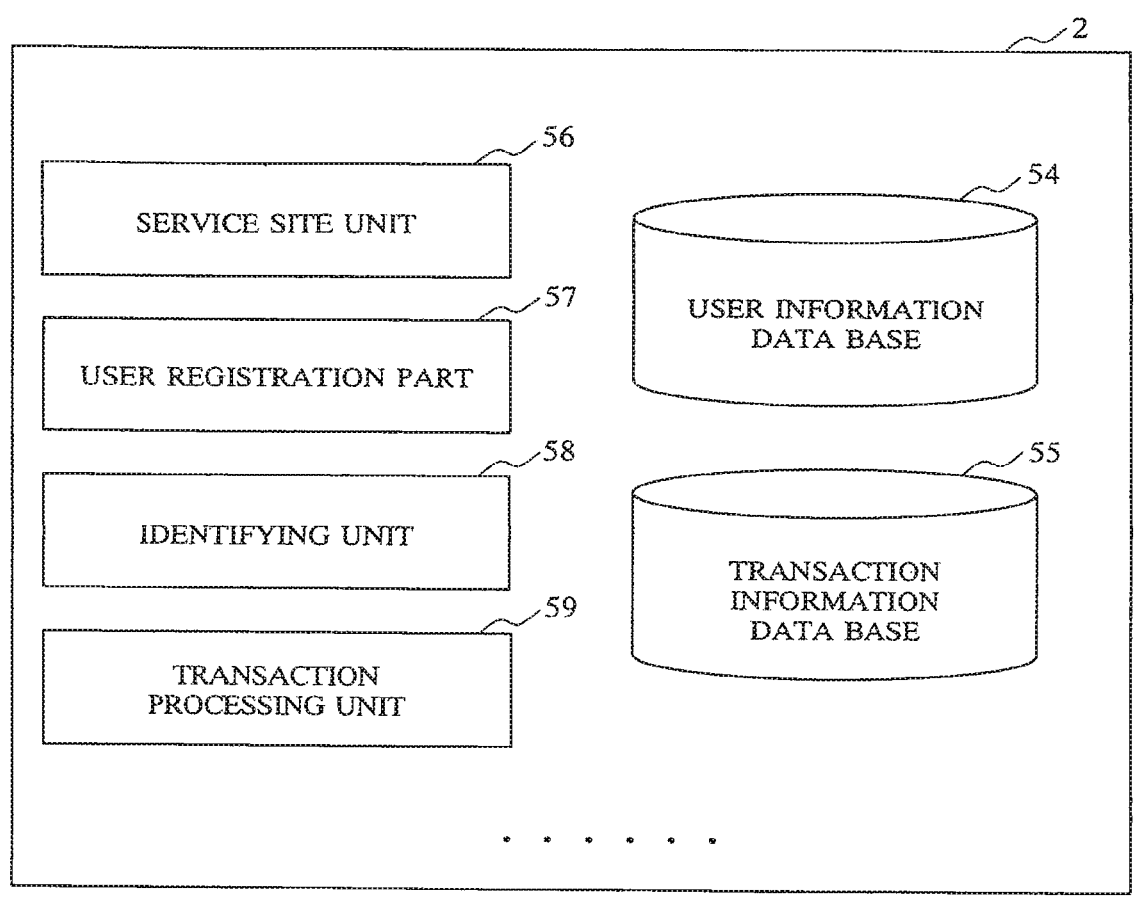
FIG. 5 is a view for explaining an example of a functional configuration of an electronic money server.

FIG. 5 is a conceptual view showing an example of a functional configuration of the electronic money server 2 (currency information issuance server apparatus). The electronic money server 2 is connected to the Internet 4 via Internet communications line, and to electronic money terminals 8, 8, 8, . . . via communications lines.

The electronic money server 2 is configured with a service site part 56, a user registration part 57, an authentication part 58, a transaction handling part 59, other various function parts, a user information database 54, a transactional information database 55, and other various databases.

Although this embodiment is configured to provide services in electronic money by the electronic money server 2, it is possible to use a configuration by combining a plurality of server apparatuses with one another, without limited the described configuration:

For example, it is possible to adopt a configuration by combining server apparatuses with one another, such as a Web server having an electronic money oriented service site opened there-in, an authentication-server for conducting user authentication, and a transaction handling server for transaction handling.

The service site part 56 is a function part for opening therein a Web site related to a service of electronic money on the Internet A.

Each user is allowed to access to the service site by inputting the URL of the service site from the associated portable telephone 7 or another terminal, thereby utilizing various services provided by the service site.

Accessing to the service site causes the electronic money server 2 to transmit a window data for displaying a main menu window to the terminal. Selectably displayed on the main menu window are items of services provided by the service site, so that the user is allowed to select a desired item therefrom.

Exemplarily prepared as the service items are those related to utilization of electronic money such as user registration and mobile charge, and those various items related to provision of announcement of campaign, receipt of inquiries from customers, and the like.

The user registration part 57 is a function part configured to handle registration information of a user utilizing an associated electronic money function part 12, such as new registration, deletion of registration, and change of registration of the user utilizing the electronic money by the associated portable telephone 7.

These handling procedures can be conducted on the Web site provided by the service site part 56.

For example, a user, who has newly purchased a portable telephone 7, is to access to the service site of the electronic money server 2 from the portable telephone 7 and selects a new registration as a service item.

Then, the service site part 56 transmits a user registration window data to the portable telephone 7, and the user inputs required items and returns them to the electronic money server 2.

The user registration part 57 stores the information transmitted from the portable telephone 7 into the user information database 54, thereby conducting user registration.

As described later, the user registration is to be conducted from the portable telephone 7, since the IC chip ID is read from the portable telephone 7 and registered with the electronic money server 2.

FIG. 6 is a view of an example of a logical configuration of user information stored in the user information database 54.

The user information is configured with items including an "electronic money ID" 61, a "user name" 62, an "issuer" 64, an "IC chip ID" 65, and the like.

Each "electronic money ID" 61 is ID information to be assigned to each IC chip of the applicable electronic money function part 12 (FIG. 4) according to new registration, and is assigned by the electronic money server 2 when the IC chip is handled to possess an electronic money handling function (for example, when a program is entered into the IC chip for causing it to exhibit an electronic money handling function, or when there is reserved a storage area in the IC chip for recording a historical transaction data by electronic money).

Although the "electronic money ID" 61 is stored in the program area 36b, the associated telephone function part 10 is capable of reading it and displaying it on the associated display 21. The associated user is thus allowed to conduct an inquiry at the time of trouble, by using the electronic money ID assigned to the user himself/herself.

Each "user name" 62 is a name of an applicable user.

Each "password" 63 is information for confirming whether or not a user intending to utilize the service is himself/herself; and is set by the user upon user registration.

The "issuer" 64 is information for specifying an issuer which issues an amount of VALUE when the user has conducted mobile charge, and the "issuer" is selected by the users upon user registration.

The issuer is a VALUE issuer, and exists in plural for a reason of operation. Further, no matter which issuer has issued an amount of VALUE, the issued amount of VALUE can be used in any one of electronic money terminals 8.

The "IC chip ID" 65 is ID information uniquely assigned to an IC chip at the time of manufacture of the IC chip, and is never changed after shipment from a factory.

The IC chip ID is generally unreadable by a user, and is read by a telephone function part 10 from an electronic money function part 12 and transmitted to the electronic money server 2 upon user registration. Thus, user registration is conducted from a portable telephone 7. It is also possible to conduct such a registration from a terminal other than a portable telephone 7, in case of a system configuration without utilizing an IC chip as user registration information.

Reverting to FIG. 5, the authentication part 58 is a function part configured to authenticate a user utilizing the service site. The procedure of authentication is as follows.

In authenticating a user, the service site part 56 transmits an authentication window data to a portable telephone 7. The authentication window is provided with a password input field, and the user inputs a password from the portable telephone 7 into the field and transmits the password to the electronic money server 2. At this time, the associated telephone function part 10 reads an IC chip ID and electronic money ID from the associated electronic money function part 12, and transmits them to the electronic money server 2 together with the password.

The electronic money server 2 searches for, in the user information database 54, the information received by the authentication part 58 from the portable telephone 7, and authenticates the applied user as a proper one in case of existence of the corresponding password, IC chip ID, and electronic money ID. Further, the authentication allows the user to be specified, thereby enabling provision of services suitable for the user.

Further, it is unnecessary to use all the password, IC chip ID and electronic money ID for authenticating a user, and it is also constitutionally possible to conduct authentication by using at least one of them.

The transaction handling part 59 is a function part configured to store transaction records of users into the transactional information database 55.

The transaction handling part 59 is configured to record transactions (all transactions conducted by portable telephones 7 and electronic money cards 15) using electronic money into the transactional information database 55 when the transactions are conducted, including mobile charge, disbursement by each portable telephone 7, and terminal-based charge and disbursement at each electronic money terminal 8.

FIG. 7 is a view of an example of a logical configuration of transactional information stored in the transactional information database 55.

The transactional information is configured with items including an "electronic money ID" 67, a "charge record" 68, a "disbursement record" 69, and the like.

Recorded in the "charge record" 68 area terminal (electronic money terminal 8 in case of terminal-based charge, and portable telephone 7 in case of mobile charge) which has conducted the charge, a time and date of the charge, a charged monetary amount of VALUE, and the like.

For example, recorded as a terminal ID in a record 71 is the IC chip ID at the first row of FIG. 6 thereby showing that it is mobile charge. Further, there was charged 1,000 yen of VALUE by this mobile charge. Furthermore, there is a record 72 representing that there was charged 3,000 yen of VALUE by terminal-based charge at an electronic money terminal 8 to be specified by a terminal ID "347895".

The "disbursement record" 69 is configured with a terminal by which the disbursement was conducted, a time and date of the disbursement, a monetary amount of VALUE according to the disbursement, and the like. For example, there is a record 73 representing that 2,000 yen of VALUE was disbursed at a terminal ID "2547657".

In case of utilization of VALUE lay a user such as charge and/or disbursement, there are obtained an electronic money ID and other information from a portable telephone 7 or an electronic money card 15, and the transaction handling part 59 utilizes them to update the transactional information database 55.

In case of mobile charge, each portable telephone 7 exhibits a function of an electronic money terminal 8 as well, so that there is recorded an IC chip ID as a terminal ID as shown by the record 71.

Analysis of the transactional information stored in the transactional information database 55 allows for collection of information utilizable for service achievement, such as distribution of cash collected from the issuers among those stores where disbursements by VALUE were conducted, and monitoring of counterfeit electronic money cards 15; and additionally recording commodities as well purchased by users enables conduction of data mining such as market research.

In the electronic money operational system 1 of this embodiment, an amount of VALUE to be used for disbursement is stored in a portable telephone 7 or electronic money card 15, and the electronic money server 2 is configured to manage the transactional information thereof.

Thus, it is unnecessary to access to the electronic money server 2 in a real-time manner even in case of disbursement by VALUE, thereby enabling a rapid handling in situ; and it is also possible to once accumulate the transactional information, in a storage device of an electronic money terminal 8, and to transfer the transactional information to the electronic money server 2 after a predetermined period of time or to cause a responsible person to collect a storage medium stored with the transactional information.

Further, in case of transferring an amount of VALUE from a portable telephone 7 to an electronic money card 15 by portable telephone-based charge (FIG. 1), for example, the transference record is temporarily stored in the portable telephone 7, and the temporarily stored information is transmitted to the electronic money server 2 when the portable telephone 7 is connected to the electronic money server 2.

There will be explained an example of a hardware-wise configuration of the electronic money server 2 (FIG. 1).

Figure 8:
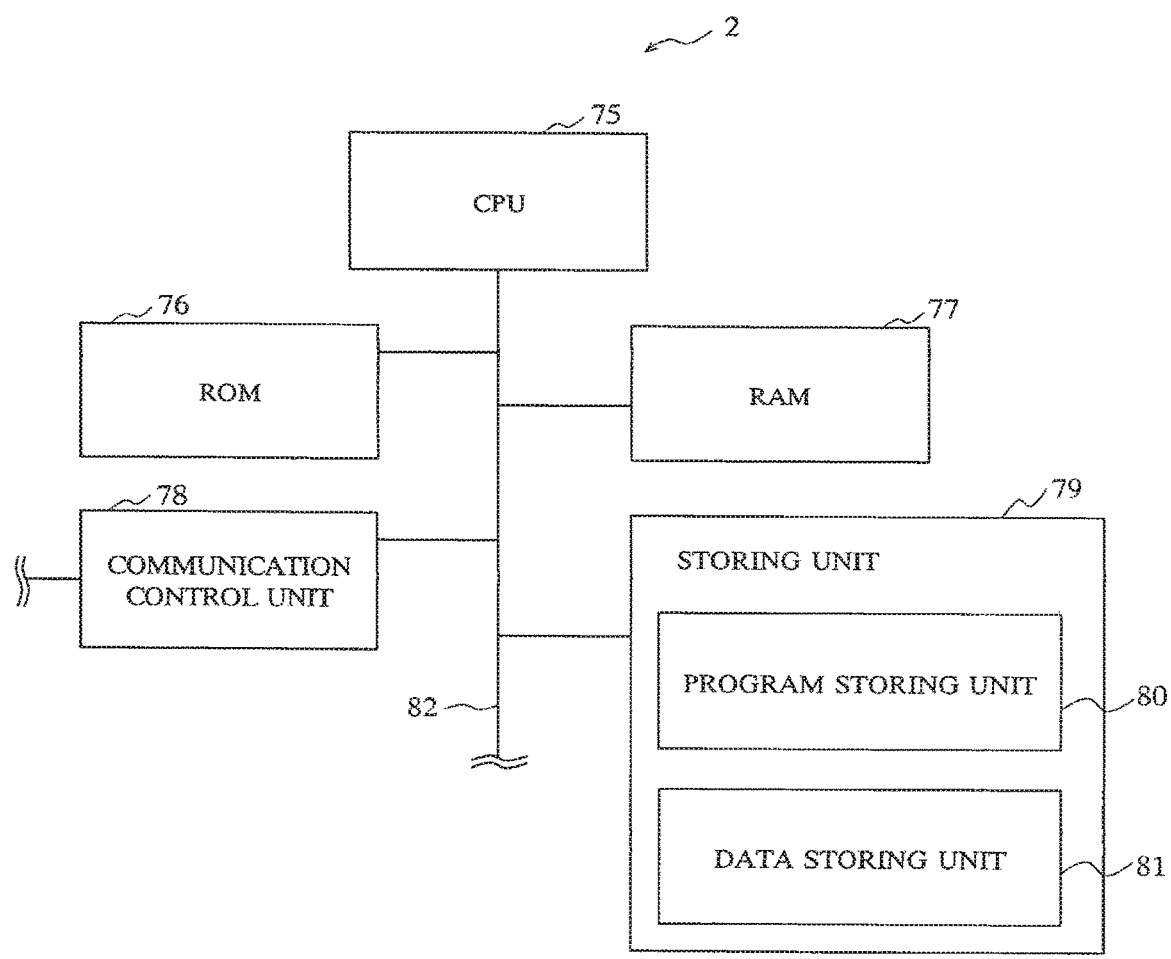
FIG. 8 is a view of an example of a hardware-wise configuration of the electronic money server.

As shown in FIG. 8, the electronic money server 2 is configured with a CPU 75, a ROM 76, a RAM 77, a communication control part 78, and a storage part 79 connected to one another via bus lines 82.

The CPU 75 is configured to conduct information processing in accordance with a predetermined program, and to control the whole electronic money server 2, for example.

The ROM 76 is a read only memory stored with a basic program, parameters, and the like for operating the electronic money server 2.

The RAM 77 is a readable and writable memory configured to provide a working memory to the CPU 75, and to load and store a program and/or data stored in the storage part 79 into the RAM 77 itself, for example.

The communication control part 78 is a function part configured to communicate with each portable telephone 7 via Internet 4 and base station 5, and to communicate with each electronic money terminal 8 via communications line.

The CPU 75 is capable of receiving information concerning transactions using an electronic money card 15 and/or portable telephone 7 from an electronic money terminal 8 through the communication control part 78, and capable of conducting mobile charge for a portable telephone 7 or conducting communications for disbursement.

The storage part 79 is configured with a hard disk or another nonvolatile memory, which is configured with a program storage part 80 stored with various programs, a data storage part 81 stored with data, and the like.

The program storage part 80 is stored with: an OS as a basic program for operating the electronic money server 2; a service site program for operating the service site; registration program for conducting user registration; an authentication program for authenticating a user; a transaction handling program for conducting transaction handling; and other programs.

Executions of these programs at the CPU 75 constitute by software the service site part 56, user registration part 57, authentication part 58, and transaction handling part 59 (FIG. 5), respectively.

The data storage part 81 is stored with the user information database 54, the transactional information database 55, and other databases (FIG. 5).

There will be now explained the authentication organization server 3 (FIG. 1).

The authentication organization server 3 is a server apparatus configured to issue a permission (so-called authority) for giving credit to a user, to the electronic money server 2, in case that the user is about to conduct charge by using a credit card, for example. The authentication organization server 3 is managed by a financial institution such as a credit company.

In case of mobile charge from the electronic money server 2 by a user by using a portable telephone 7 in this embodiment, the amount of money therefor is withdrawn from an applicable credit company or financial institution such as bank. Thus, the electronic money server 2 asks the authentication organization server 3 upon mobile charge whether or not credit may be given to the user, and the mobile charge is conducted in case of issuance of permission while the mobile charge request from the user is rejected in case of non-issuance of permission.

There will be explained electronic money terminals 8 (FIG. 1).

The electronic money terminals 8, 8, 8, . . . (hereinafter merely called "electronic money terminal 8") each comprise a terminal device configured to conduct VALUE charge, disbursement by VALUE, and the like by rewriting the amount of VALUE for an applicable electronic money function part 12.

Each electronic money terminal 8 is exemplarily installed in a check-out counter of a convenience store, and a user is supposed to be allowed to conduct charge and disbursement of VALUE by closely exposing (or placing) the portable telephone 7 to (or in) a predetermined part (reader/writer part) of the electronic money terminal 8.

The reader/writer part of the electronic money terminal 8 internally includes an antenna configured to emit radio waves within a short range. Closely exposing the portable telephone 7 to the reader/writer part allows for transmission/receipt of data by radio waves between a terminal antenna 35 of the electronic money function part 12 and an antenna of the electronic money terminal 8. The electronic money terminal 8 is capable of rewriting the amount of VALUE of the electronic money function part 12 in a non-contact manner, by conducting the transmission/receipt by radio waves.

The electronic money terminal 8 is network connected to the electronic money server 2 via communications line such as a digitized telephone line, and is configured to transmit information concerning charge and disbursement to the electronic money server 2.

In this way, each electronic money terminal 8 possesses a reader/writer function for reading data of an IC chip of an applicable electronic money function part 12, and a function for communicating with the electronic money server 2.

Information to be transmitted from each electronic money terminal 8 to the electronic money server 2 are those information for specifying the electronic money terminal 8 in which handling was conducted, the electronic money function part 12, and the details of the handling, such as a terminal ID (ID for identifying the applicable electronic money terminal 8), an electronic money number (a number uniquely assigned to the applicable electronic money function part 12), the monetary amount of VALUE in case of charge or the monetary amount of VALUE in case of disbursement, a time and date of the charge or disbursement, and the like.

These information allow the electronic money server 2 to know the monetary amount of VALUE stored in each electronic money function part 12, and to know as to which electronic money function part 12 has been charged or has disbursed at which electronic money terminal 8 by what amount.

Further, each electronic money terminal 8 is capable of conducting charge and disbursement of VALUE for an electronic money card 15 to be described later; in the same manner as each electronic money function part 12.

Note that each electronic money terminal 8 is installed in a retail store in this embodiment, and is supposed to be capable of conducting both VALUE charge and disbursement.

Additionally, it can be installed at a place where an amount of money is collected from a user, such as a vending machine, a ticket gate of a station, a platform of a bus, a taxi, and an entrance of a movie theater. In such a case, it is possible to install an electronic money terminal 8 dedicated for disbursement.

It is also possible to install an electronic money terminal 8 dedicated for charge to thereby allow for VALUE charge, at a relatively crowded place such as a public square or park.

Although the network connection between each electronic money terminal 8 and the electronic money server 2 are usually achieved by using a typically digitized telephone line, it is additionally possible to achieve it by a dedicated line.

It is also possible to install a wireless terminal near an electronic money terminal 8, and to constitutionally connect between the electronic money terminal 8 and the wireless terminal via wireless link. Since a single wireless terminal is capable of wirelessly communicating with a plurality of electronic money terminals 8, it is occasionally possible to achieve a lower cost rather than provision of a line for each electronic money terminal 8. The proposed wireless scheme is advantageous in an exemplary case of combiningly managing a plurality of electronic money terminals 8 installed at vending machines, respectively.

Further, it is possible to install a storage medium in an electronic money terminal 8 and to cause the storage medium to store therein data of handling details for portable telephones 7, and to cause a responsible person to go there to collect the storage medium.

This scheme is advantageous incase of installation of an electronic money terminal 8 in a mobile object such as bus, taxi, airplane, and ship, for example.

There will be now explained an electronic money card 15 (FIG. 1).

Each electronic money card 15 comprises a plastic case internally including a terminal antenna and an IC chip, similarly to an electronic money function part 12.

Figure 9:
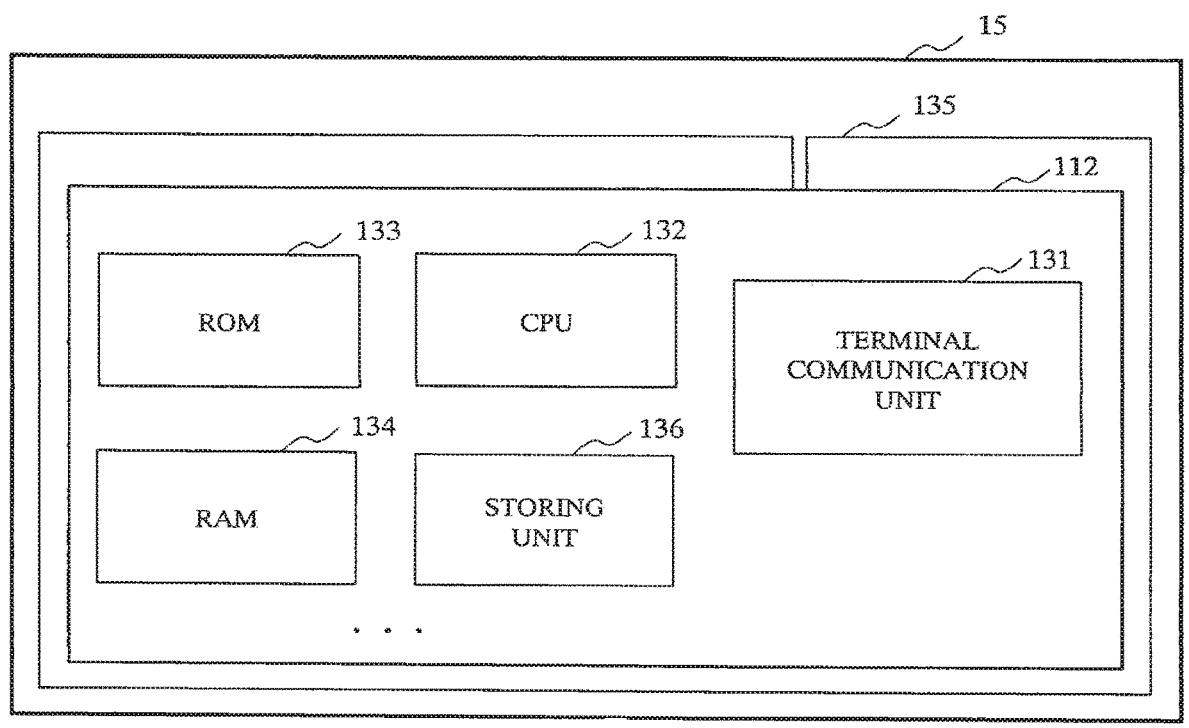
FIG. 9 is a view of an example of a hardware-wise configuration of an electronic money card.

FIG. 9 is a view of an example of a hardware-wise configuration of an electronic money card 15.

The electronic money card 15 comprises an IC chip 112, and comprises a CPU 132, a ROM 133, a RAM 134 a storage part 136, and a terminal communication part 131 configured on the IC chip 112. Further, it also comprises a terminal antenna 135 configured to supply electric power to the IC chip 112 and to conduct transmission/receipt of signals.

The electronic money card 15 is also capable of conducting charge and disbursement of VALUE in a non-contact manner identically to an electronic money function part 12, by closely exposing the electronic money card 15 to a predetermined part of an electronic money terminal 8.

At this time, the terminal antenna 135 of the electronic money card 15 receives radio waves emitted from the electronic money terminal 8 to thereby conduct power generation, thereby supplying electric power for driving the IC chip 112. In this way, the terminal antenna 135 achieves both power generation, and data transmission/receipt in relation to the electronic money terminal 8. Signals transmitted/received between the electronic money card 15 and electronic money terminal 8 are encrypted.

In case of an IC chip of an electronic money function part 12 of a portable telephone 7, the electronic money function part 12 is capable of obtaining electric power from an electronic money terminal 8 or from the electric Power source of the portable telephone 7, since the electronic money function part 12 is capable of being supplied with electric power from the electric-power source of the portable telephone 7.

Usually, the electronic money function part is configured to obtain electric power from a battery of the portable telephone 7 when the electric power source of the portable telephone 7 is in an ON state, and from an electronic money terminal 8 when the electric-power source of the portable telephone 7 is in an OFF state.

The CPU 132, ROM 133, RAM 134, storage part 136, and terminal communication part 131 configured on the IC chip 112 have the same functions as the CPU 32, ROM 33, RAM 34, storage part 34, and terminal communication part 31 of the electronic money function part 12, respectively.

Namely, the storage part 136 is stored with a VALUE handling program, and execution thereof constitutes by software a VALUE handling part. Further, the storage part 136 is formed with a log data storage part.

By virtue of an operation of the VALUE handling part, it is possible to conduct charge of VALUE and disbursement by VALUE, by setting the electronic money card 15 in a reader/writer part of an electronic money terminal 8.

There will be explained a situation for conducting portable telephone-based charge for the above configured electronic money card 15 from a portable telephone 7;

The portable telephone 7 has an electronic money function part 12 provided with a terminal antenna 35 and with a battery for driving the portable telephone 7. This enables wireless communications between the electronic money function part 12 and the electronic money card 15, by setting the electronic money card 15 closely to the portable telephone 7, and by emitting radio waves from the terminal antenna 35 thereof by utilizing electric power of the battery of the portable telephone 7.

In this case, the electric power for driving the electronic money card 15 is supplied by radio waves emitted by the terminal antenna 35 of the electronic money function part 12.

In this way, by conducting wireless communications between the electronic money function part 12 and the electronic money card 15 while driving the electronic money card 15, and by transmitting an entering command from the electronic money function part 12 to the electronic money card 15, the CPU 132 of the electronic money card 15 is allowed to conduct a VALUE entering procedure to thereby conduct VALUE charge. Further, there is conducted a subtraction procedure for the VALUE stored in the electronic money function part 12, by the Monetary amount of VALUE transmitted from the electronic money function part 12 to the electronic money card 15.

In this way, it is possible to transfer an amount of VALUE from the electronic money function part 12 to the electronic money card 15.

Contrary, it is possible to transfer an amount of VALUE from the electronic money card 15 to the electronic money function part 12, by transmitting a subtraction command from the electronic money function part 12 to the electronic money card 15 to thereby conduct a VALUE subtraction procedure in the electronic money card 15, and by entering the subtracted monetary amount of VALUE into the electronic money function part 12.

In this way, in case of VALUE transference between the electronic money function part 12 and the electronic money card 15, the electronic money function part 12 exhibits the same function as an electronic money terminal 8.

In the electronic money operational system 1 as described above, each portable telephone 7 possesses the same VALUE handling functions as those of an electronic money card 15, and is capable of conducting terminal-based charge from an electronic money terminal 8, and capable of downloading an amount of VALUE from the electronic money server 2 via Internet 4 to thereby conduct mobile charge.

Further, it is possible to conduct portable telephone-based charge by transferring an amount of VALUE from the portable telephone 7 to an electronic money card 15 or another portable telephone 7.

Figure 10:
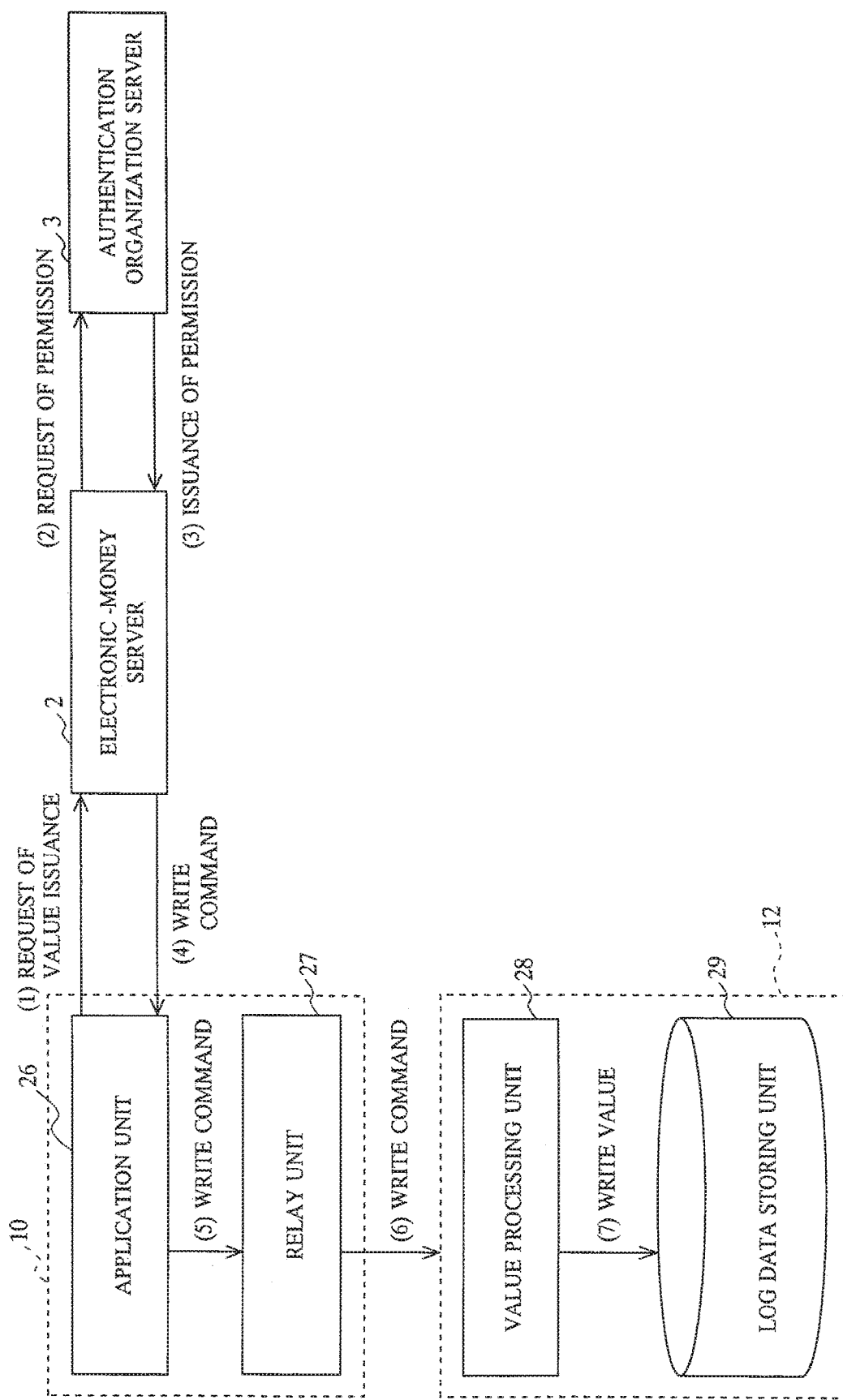
FIG. 10 is a view for explaining a procedure of mobile charge.

There will be now explained operations of the components in case of mobile charge in the above configured electronic money operational system 1, with reference to FIG. 10. Note that the interface part 11 is not shown.

It is supposed here that a portable telephone 7 has already accessed to a site for mobile charge, and a communications link has been established between the electronic money server 2 and the portable telephone 7.

In this embodiment, the electronic money server 2 and the portable telephone 7 conduct communications therebetween by utilizing the thus established communications link, thereby conducting mobile charge to the portable telephone 7.

Note that, to access to the site for mobile charge, the portable telephone 7 is to firstly access to the electronic money server 2, and to select "mobile charge" from variously provided services.

Then, the portable telephone 7 displays on its display 21 a password input field as shown in FIG. 11(a), and a password is inputted thereinto and transmitted to the electronic money server 2. At this time, the portable telephone 7 retrieves its electronic money ID and IC chip ID, and transmits them as well to the electronic money server 2. Upon authentication of these information, the portable telephone 7 is allowed to access to the site for mobile charge.

Note that such information and those information transmitted to/received from the electronic money server 2 are supposed to be encrypted.

Reverting to FIG. 10, explanation will be conducted along bracketed numerical characters in FIG. 10.

(1) Firstly, a user inputs a monetary amount of VALUE to be charged, from a mobile charge window (FIG. 11(*b*)). The mobile charge window is provided with a monetary amount input field, and it is possible to set a monetary amount by inputting the same from the associated keyboard 22.

The associated application part 26 uses the monetary amount inputted in the monetary amount input field to thereby transmit monetary amount specifying information for specifying the monetary amount to be charged, to the electronic money server 2, thereby requesting it to issue an amount of VALUE (transmission of request information).

(2) Upon receipt of the monetary amount specifying information from the application part 26, the electronic money server 2 requests the authentication organization server 3 to issue permission for giving credit to the User.

(3) The authentication organization server 3 checks a credit state of the user, and transmits permission to the electronic money server 2. Note that the electronic money server 2 does not issue an amount of VALUE, in case of non-issuance of permission.

(4) Upon receipt of the permission issuance from the authentication organization server 3, the electronic money server 2 transmits an entering command to the application part 26. This entering command includes parameters set for entering an amount of VALUE by the monetary amount inputted by the user.

(5) The application part 26 receives the entering command from the electronic money server 2, and delivers it to the relay part 27.

(6) The relay part 27 inputs the entering command into the VALUE handling part 28.

(7) The VALUE handling part 28 executes the entering command, and updates the log data storage part 29, thereby conducting an addition procedure of VALUE.

Although not shown, the VALUE handling part 28 outputs completion information representing completion of VALUE entering, upon achieving the same, to the application part 26, and the application part 26 transmits the information to the electronic money server 2.

Further, the display 21 displays thereon a window shown in FIG. 11(*c*), thereby showing a currently remaining amount after charge.

Although the mobile charge has been conducted in an on-line state of the portable telephone 7 in this embodiment, the scheme of mobile charge is not limited thereto. For example; it is possible to conduct mobile charge, by causing the electronic money server 2 to transmit an electronic mail having an entering command attached thereto to the portable telephone 7, and by executing the received entering command at the portable telephone 7 in an off-line state thereof.

In this case, it is constitutionally possible to automatically access from the portable telephone 7 to the electronic money server 2 upon completion of the mobile charge, thereby notifying the electronic money server 2 of the completion of mobile charge.

It is also possible to transfer an entering command received in a state attached to an electronic mail, to another portable telephone 7 for execution thereby, to conduct mobile charge for the other portable telephone 7.

There will be explained operations of the components in case of conducting terminal-based charge in the electronic money operational system 1 with reference to FIG. 12. Note that the interface part 11 is not shown.

It is further supposed that a portable telephone 7 is set in a reader/writer part of an electronic money terminal 8. At this time, there is established a wireless communications link between the reader/writer part of the electronic money terminal 8 and a terminal communication part 31 of the electronic money function part 12, so that the electronic money terminal 8 and the electronic money function part 12 conduct communications by using the communications link.

(1) Firstly, there is inputted an amount of money to be charged, into the electronic money terminal 8. This causes it to execute transmission of an entering command for entering the inputted monetary amount of VALUE. At that time, the electronic money terminal 8 is supposed to receive an electronic money ID, an IC chip ID, and the like from the VALUE handling part 28.

(2) Then, the electronic money terminal 8 wirelessly transmits an entering command for entering an amount of VALUE by the monetary amount set from the reader/writer part, to the VALUE handling part 28.

(3) The VALUE handling part 28 receives the entering command transmitted from the reader/writer part of the electronic money terminal 8. Then, it executes the command to thereby update the log data of the log data storage part 29, thereby conducting charge of the monetary amount of VALUE set by the entering command.

Further, the handling details in relation to the electronic money function part 12 are recorded as the log data. These log data are transmitted to the electronic money server 2, collectively at a later time, or in a real-time manner.

The above describes procedures in case of VALUE charge, and VALUE disbursement can also be conducted by the electronic money function part 12 in the same procedures.

Namely, inputting an amount of money to be disbursed into the electronic money terminal 8, causes the electronic money terminal 8 to generate a subtraction command for subtraction of the inputted monetary amount of VALUE and to transmit it to the VALUE handling part 28. The VALUE handling part 28 executes the subtraction command, thereby conducting a subtraction procedure for the VALUE recorded in the log data storage part 29.

Figure 12:
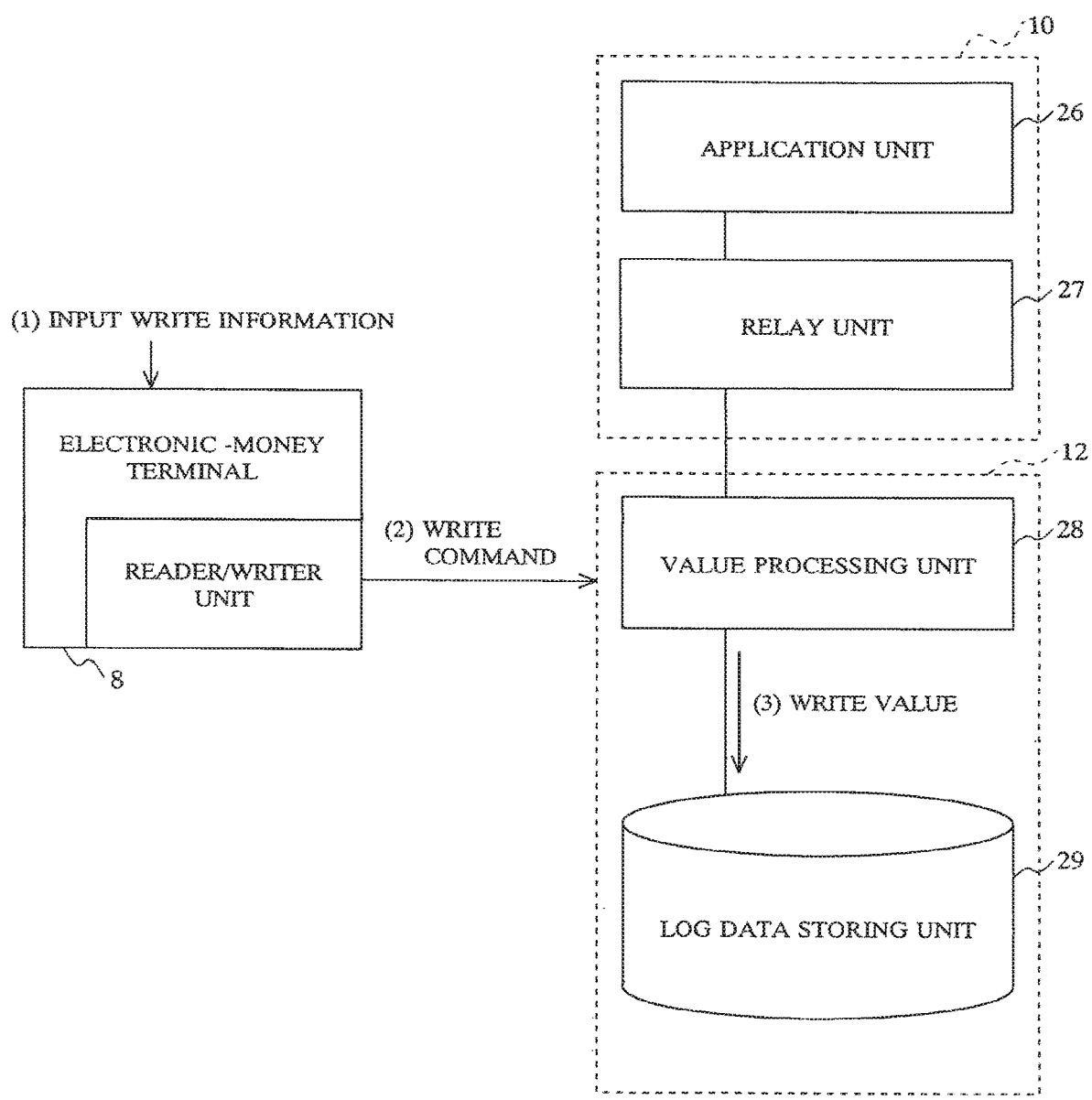
FIG. 12 is a view for explaining a procedure of terminal-based charge.

Although the VALUE handling for the electronic money function part 12 has been explained in FIG. 12, the electronic money terminal 8 is also capable of conducting the same VALUE handling for an electronic money card 15.

In this case, it is possible to conduct charge or disbursement, by setting the electronic money card 15 into the reader/writer part of the electronic money terminal 8, and by inputting an entering command or subtraction command into the reader/writer part.

Figure 13:
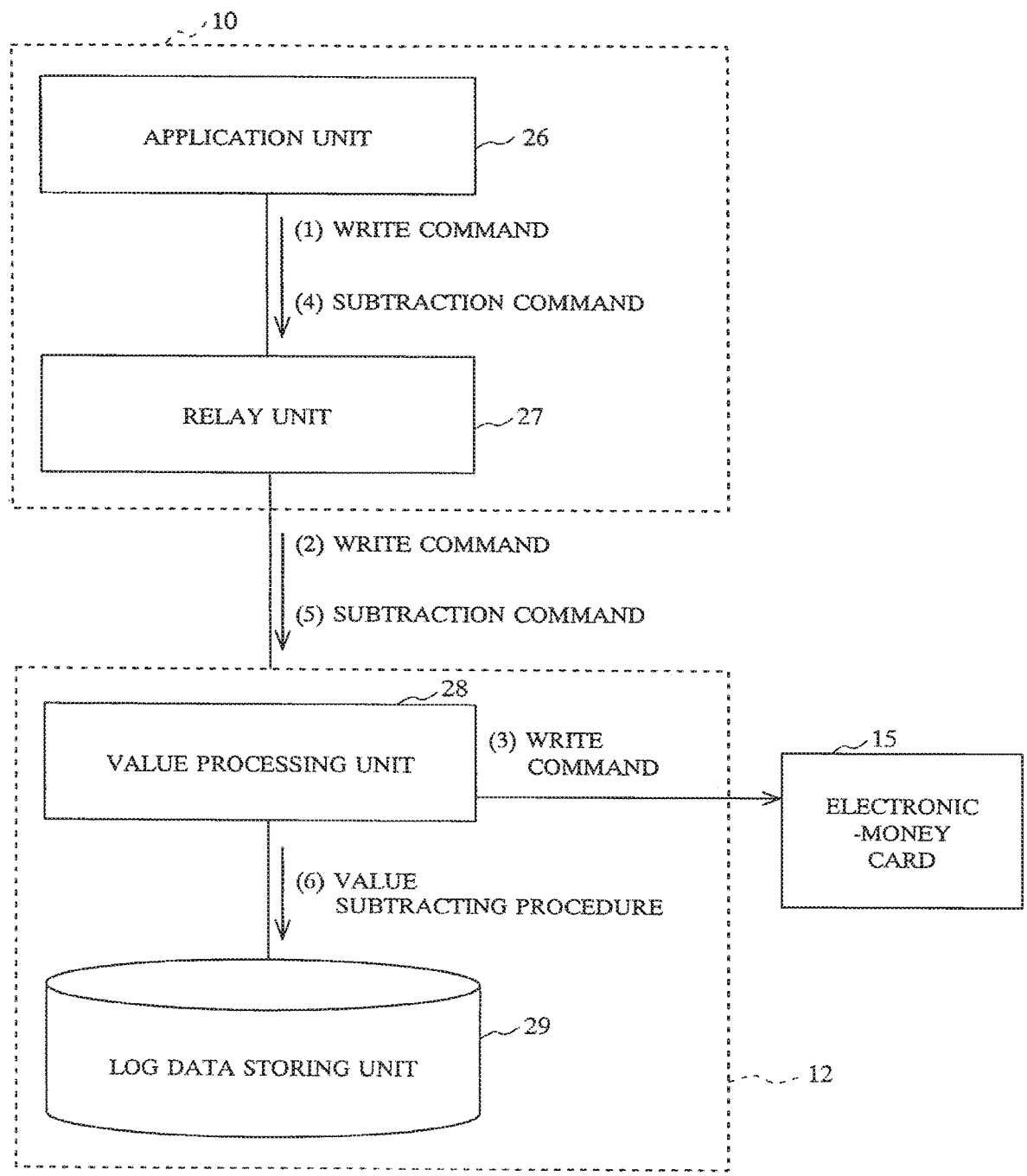
FIG. 13 is a view for explaining a procedure of portable telephone-based charge.

There will be explained operations of the components in case of conducting portable telephone-based charge in the electronic money operational system 1, with reference to FIG. 13. Note that the interface part 11 is not shown.

It is supposed here that the electronic money card 15 is set closely to a predetermined part (such as a back surface) of the electronic money terminal 8, so as to conduct wireless communications between the electronic money function part 12 and the electronic money card 15.

It is possible to utilize an accessory for keeping a setting position of the electronic money card 15 during portable telephone-based charge.

In case of portable telephone-based charge, the electronic money function part 12 drives an associated terminal communication part 31 to emit radio waves from an associated terminal antenna 35 to the antenna 135 of the electronic money card 115, thereby supplying electric power by the radio waves to the electronic money card 15.

Driving the electronic money card 15 by electric power enables establishment of wireless communications link between the electronic money function part 12 and the electronic money card 15; and the electronic money function part 12 is to conduct communications with the electronic money card 15 through the communications link.

(1) Firstly; the user selects "VALUE transference" from selection items displayed on a display 21 by the application part 26. At this time, the electronic money function part 12 supplies electric power to the electronic money card 15, thereby starting communications. Further, the electronic money function part 12 reads an IC chip ID and the like from the electronic money card 15, and stores them. These are stored as a log data.

Then, displayed on the display 21 is a transference monetary amount input field for inputting a monetary amount to be transferred. The user inputs the monetary amount to be transferred, and clicks an execution button displayed on the display 21.

This causes the application part 26 to generate an entering command for entering the inputted monetary amount of VALUE, and delivers it to the relay part 27.

(2) The relay part 27 receives the entering command from the application part 26, and wirelessly transmits it to the VALUE handling part 28.

(3) The VALUE handling part 28 transmits radio waves from the terminal antenna 35 to the electronic money card 15, thereby supplying electric power for driving the electronic money card 15.

Further; the entering command for adding the transferred monetary amount of VALUE, is transmitted to the VALUE handling part of the electronic money card 15; while driving the electronic money card 15.

The electronic money card 15 executes the entering command to update the log data recorded in the storage part 136, thereby conducting VALUE charge.

In this case, the VALUE handling part 28 performs a function as a reader/writer-part for the electronic money card 15.

(4) Next, the application part 26 generates a subtraction command for subtracting the monetary amount of VALUE transferred to the electronic money card 15, and delivers it to the relay part 27.

(5) The relay part 27 receives the subtraction command from the application part 26, and inputs it into the VALUE handling part 28.

(6) The VALUE handling part 28 executes the subtraction command to subtract the monetary amount of VALUE transferred to the electronic money card 15, from the VALUE stored in the log data storage part 29.

Described above is a situation for transferring an amount of VALUE from the portable telephone 7 to the electronic money card 15, and it is possible to conversely transfer an amount of VALUE from the electronic money card 15 to the portable telephone 7. In this case, the VALUE handling part 28 transmits a subtraction command to the electronic money card 15, and conducts an addition procedure for the log data storage part 29. Similarly, it is possible for the portable telephone 7 to transfer an amount of VALUE to another portable telephone 7.

While VALUE transference can be realized by combining an entering command with a subtraction command as described above, it is also possible to provide the electronic money function part 12 with a processing unit, configured to once subtract (or add) an amount of VALUE from (onto) the remaining amount of VALUE so as to store such a procedure as a log, and to later add (or subtract) the amount of VALUE to (or from) the electronic money card 15.

Figure 14:
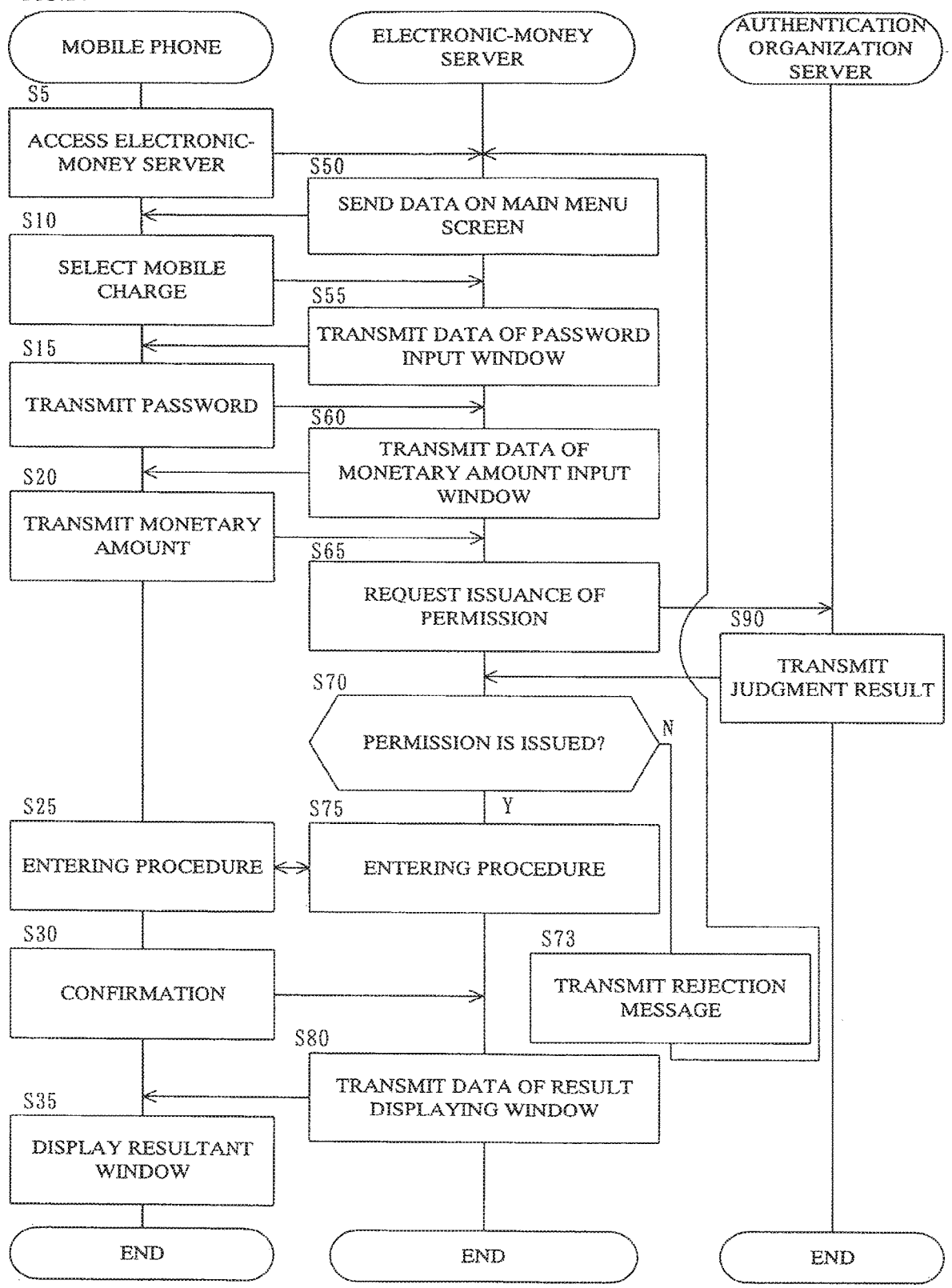
FIG. 14 is a flowchart for explaining the procedure for conducting the mobile charge.

FIG. 14 is a flowchart for explaining the procedure for conducting the mobile charge.

Firstly, the telephone function part 10 is brought into an Internet connecting mode to thereby access to the service site of the electronic money server 2 (step S5).

In response thereto, the electronic money server 2 transmits a window data for displaying the main menu window, to the portable telephone 7 (step S50).

The telephone function part 10 receives it, and displays the main menu window on the display 21. Here, it is supposed to select "mobile charge", such that the telephone function part 10 transmits information representing selection of "mobile charge", to the electronic money server 2 (step S10).

The electronic money server 2 receives it, and transmits a window data for displaying a password input window to the portable telephone 7 (step S55).

The telephone function part 10 receives the window data, and displays the password input window on the display 21. The user inputs a password into the window, and transmits it to the electronic money server 2 (step S15).

The electronic money server 2 authenticates the password, and then transmits a window data for displaying a monetary amount input window, to the portable telephone 7 (step S60).

The telephone function part 10 receives the window data, and displays the monetary amount input window on the display 21. The user inputs a monetary amount to be charged, and transmits it to the electronic money server 2 (step S20).

The electronic money server 2 requests the authentication organization server 3 for permission for issuing an amount of VALUE to the user (step S65), and the authentication organization server 3 transmits a judgment result to the electronic money server 2 (step S90).

In case of absence of permission issuance (step S70; N), the electronic money server 2 transmits a rejection message to the portable telephone 7 (step S73), and then returns to step S50.

In case of issuance of permission (step S70; Y), the electronic money server 2 communicates with the telephone function part 10 to thereby conduct an entering procedure of VALUE (step S75, step S25).

Upon completion of VALUE entering at the telephone function part 10; the user confirms it, and transmits a signal representing confirmation to the electronic money server 2 (step S30).

The electronic money server 2 receives it, and transmits, to the portable telephone 7, a window data for displaying a result displaying window representing completion of mobile charge, thereby completing handling (step S80).

At the portable telephone 7, the telephone function part 10 uses the data to thereby display the result displaying. window on the display 21, thereby completing the handling (step S35).

Figure 15:
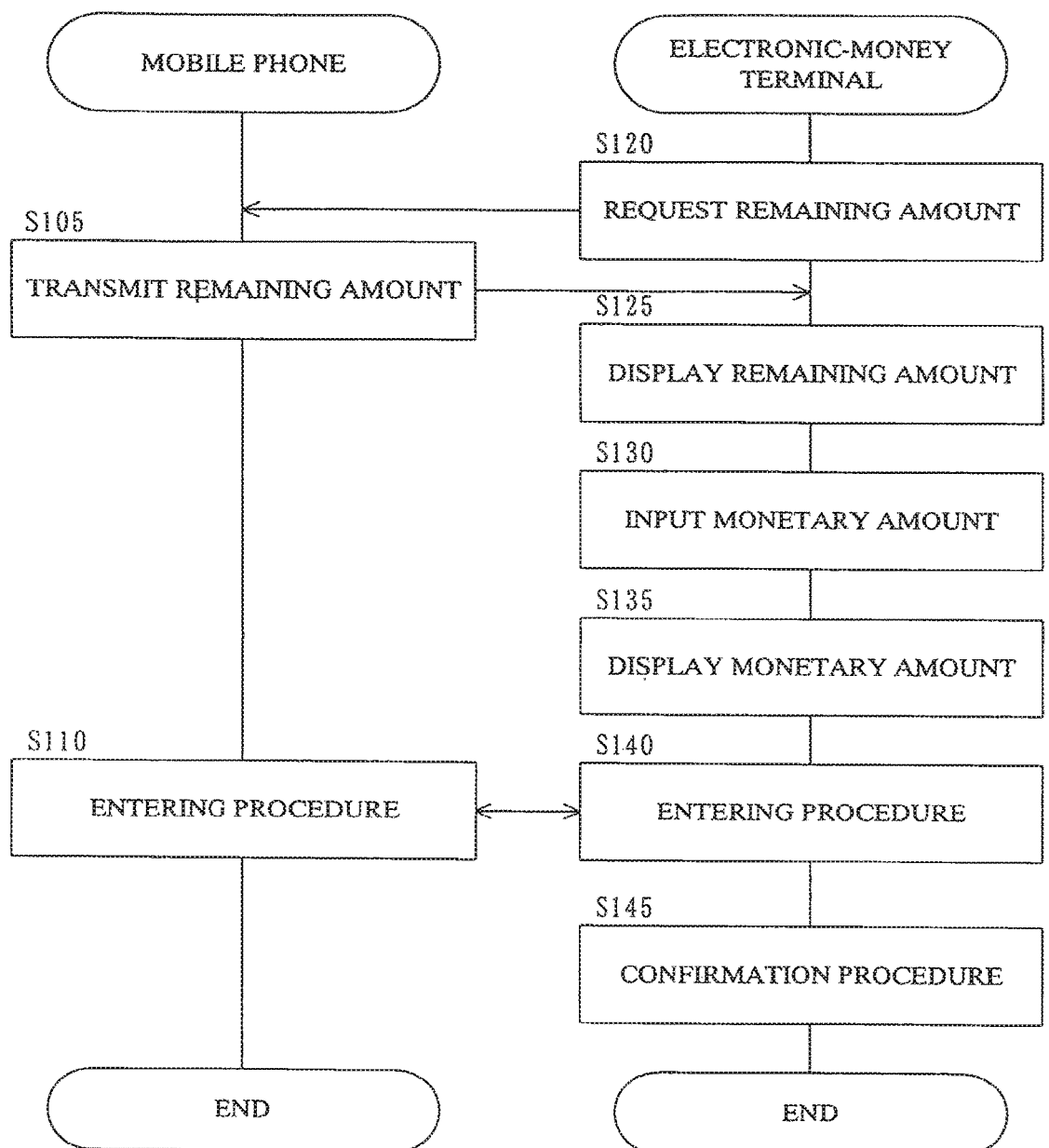
FIG. 15 is a flowchart for explaining the procedure for conducting the terminal-based charge.

FIG. 15 is a flowchart for explaining the procedure for conducting the terminal-based charge.

It is supposed here that the portable telephone 7 has been set in an electronic money terminal 8.

Firstly, the electronic money terminal 8 requests the portable telephone 7 for the currently remaining amount (step S120).

At the portable telephone 7, the electronic money function part '12 transmits the currently remaining amount to the electronic money terminal 8 (step S105).

The electronic-money terminal 8 acquires the remaining amount from the electronic money function part 12, thereby displaying it on the display unit of the electronic money terminal 8 (step S125). This allows a user to confirm the remaining amount before charge.

Next, the electronic money terminal 8 accepts an input of an amount of money. to be charged from a responsible person, for example (step S130). Then, the. electronic money terminal 8 displays the inputted amount of money on the display unit of the electronic money terminal 8 (step S135).

The user confirms the displayed amount of money, and then pushes a confirmation button provided on the electronic money terminal 8.

Pushing the confirmation button causes the electronic money terminal 8 to communicate with the electronic money function part 12 thereby transmitting an entering command to the electronic money function part 12 (step S140).

The electronic money function part 12 receives the entering command, and conducts a VALUE entering procedure (step S110).

The electronic money terminal 8 acquires the remaining amount from the electronic money function part 12 after VALUE entering, and displays it on the display unit '(step S145).

Figure 16:
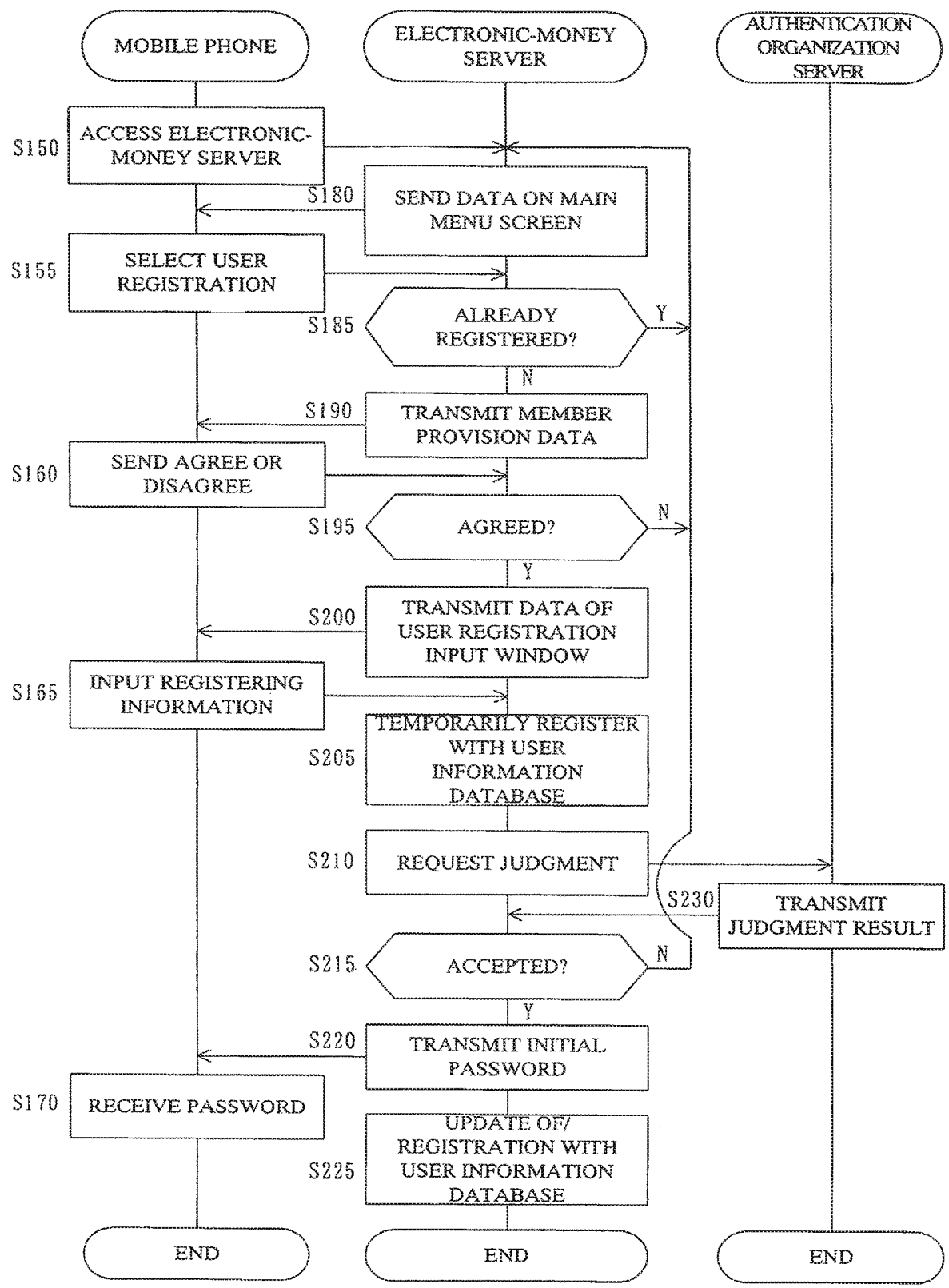
FIG. 16 is a flowchart for explaining a procedure for conducting user registration.
Figure 17:
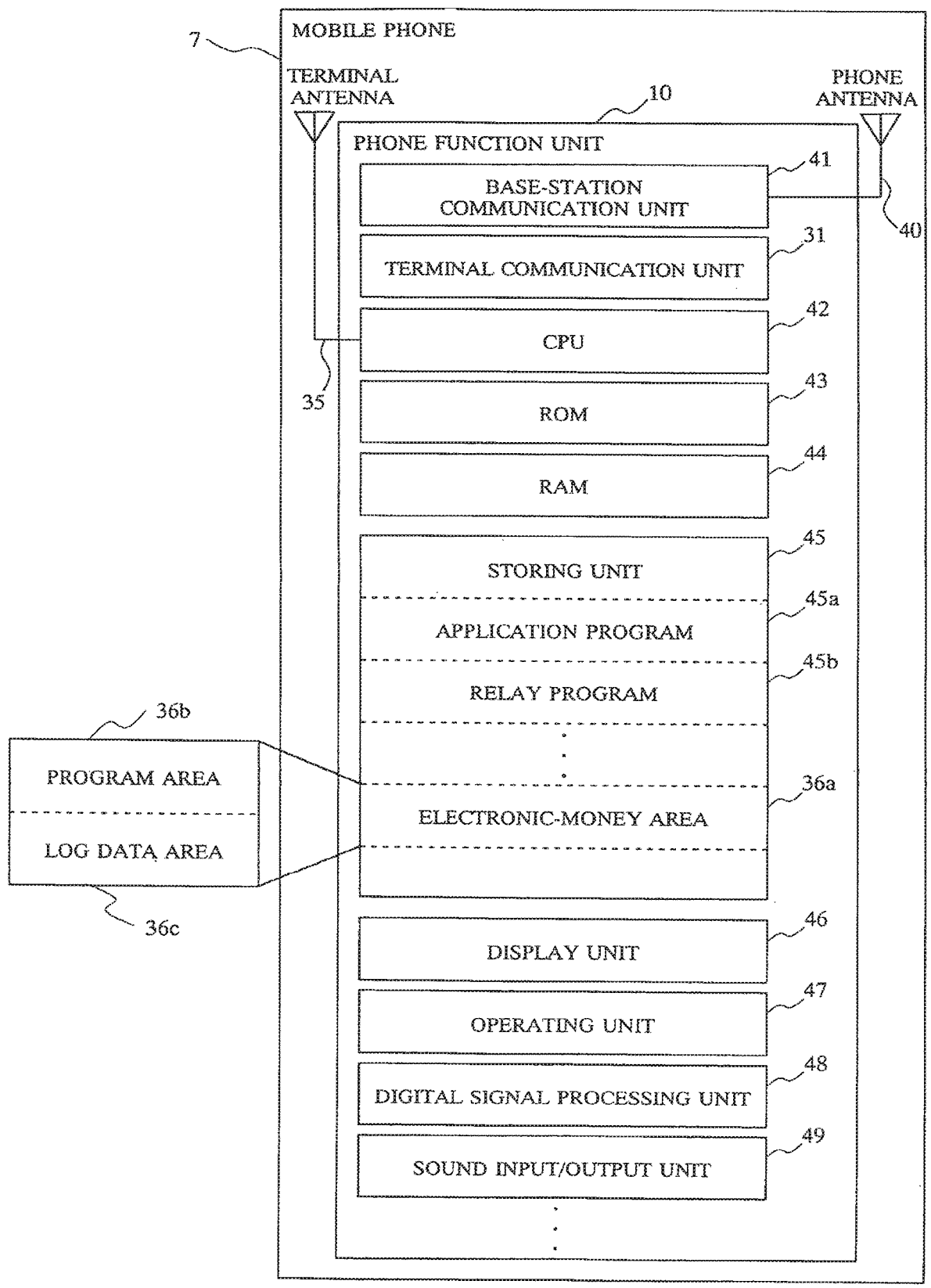
FIG. 17 is a view for explaining a modified configuration.

FIG. 16 is a flowchart for explaining a procedure for conducting user registration.

Firstly, the user accesses to the service site of the electronic money server 2 from the portable telephone 7 (step S150).

In response thereto, the electronic money server 2 transmits a window data for displaying a main menu, to the portable telephone 7 (step S180).

The telephone function part 10 uses the window data to thereby display the main menu window. Here, the user is. supposed to select "user registration".

Upon selection of "user registration" by the user, the telephone function part 10 transmits information representing the selection of "user registration", to the electronic money server 2 (step S155).

At this time, when the electronic money function part 12 is previously stored with an electronic money ID (when user registration has been conducted), the telephone function part 10 transmits it as well to the electronic money server 2.

The electronic money server 2 receives these information. Further, it judges whether or not it has received the electronic money ID from the portable telephone 7, thereby judging whether or not user registration has been conducted for the portable telephone 7, and in case that user registration has been conducted for the portable telephone 7 (step S185; Y), the server transmits information representing that registration has been done, to the portable telephone 7, and then returns to step S180.

When user registration has not been done (step S185; N), the server transmits a member provision data to the portable telephone 7 (step S190).

The telephone function part 10 receives the member provision data, and displays it on the display 21. According to the member provision, it is possible to select agreement or disagreements so that the user is to transmit information of agreement or disagreement to the electronic money server 2 (step S160).

When the user disagrees with the member provision (step S195; N), the electronic money server 2 breaks off the registration procedure, and returns to step S180.

In case of agreement (step S195; Y), the electronic. money server .2 transmits a window data for displaying a user registration input window, to the portable telephone 7 (step S200).

The electronic money function part 12 receives the window data, and displays the user registration input window on the display 21.

Thee-user inputs due items, and transmits them to the electronic money server 2 (step S165).

The electronic money server 2 receives them from the portable telephone 7 and enters. them into the user information database 54, thereby temporarily registering the user (step S205).

Next, the electronic money server 2 requests the authentication organization server 3 for a judgment as to whether or not the user registration is accepted, and in response thereto, the authentication organization server 3 transmits a judgment result to the electronic money server 2 (step $230).

When the judgment result represents rejection (step S210; N), the electronic money server 2 transmits a message representing rejection to the portable telephone 7 and breaks off the registration procedure to return to, step S180.

When the judgment result represents acceptance (step S215; Y), the electronic money server 2 issues an initial password and transmits it to the portable telephone-7 (step S220). This initial password can be changed later by the user.

The telephone function part 10 receives. the password and displays it on the display 21 (step S170).

Further, the electronic money server 2 records the initial password in the user information database 54 to thereby update the user registration information, thereby finalizing the registration procedure (step S225).

It is possible for a user to conduct user registration with the electronic money server 2 in the above manner, and once registered, the user is allowed to conduct with the electronic money server 2 procedures fora change of user information, an inquiry about the password, cancellation of the registration, and the like.

In case of change of the user information, there is again requested a judgment about the user to the authentication organization server 3.

The inquiry of password is to be conducted to transmit the password, which has been forgotten by the user, to the portable telephone 7 to thereby. show it to, the user. As such, there is/are registered a plurality of or a single information which is/are hardly known by those except for the user, such as a birthday, an original family name, favorite food; or the like upon user registration, thereby enabling later authentication of the user by such information.

According to the electronic' money operational system 1 of this embodiment described above, the following effects can be obtained.

(1) Each portable telephone 7 internally includes an electronic money function part 12 so that a user is not required to hold an electronic money card 15 separately from the portable telephone 7. Further, the electronic money function part 12 can be driven by using an electric-power source of the portable telephone 7.

(2) The user is allowed to receive VALUE charge from the electronic money server 2 by utilizing the Internet connecting' function of the portable telephone 7, so that the user is allowed to conduct VALUE charge without being bound by time and place.

(3) The electronic money function part 12 is provided with a terminal antenna 35 for communicating with an electronic money terminal 8 similarly to an electronic money card 12, so that the electronic money function part 12 is capable of conducting procedures for charge, disbursement, and the like at the electronic money terminal 8 similarly to the electronic money card 15.

(4) It is possible to transfer an amount of VALUE between the portable telephone 7 and an electronic-money card 15 or another portable telephone 7, by utilizing the: electric-power source of the firstly mentioned portable telephone 7 to cause its electronic money function part 12 to exhibit a reader/writer function.

While one embodiment of the present invention has been described above, the present invention is not limited to the described embodiment, and various modification can be made within the scope of the appended claims.

For example, the portable terminal device internally including the electronic money function part 12 is not limited to the portable telephone 7, and applicably embraces those portable electronic devices accessible to the electronic money server 2 via network, such as a PDA (Personal Digital Assistant: portable information terminal) and pocket beeper.

(Modified Configuration)

There will be explained a modified configuration of this embodiment. This modified configuration is configured to constitute a portable telephone 7 such that a CPU of its telephone function part 10 performs a VALUE handling function as well.

FIG. 14 is a view of an example of a hardware-wise configuration of a portable telephone according to the modified configuration Like reference numerals as used in the above embodiment are used to denote corresponding or identical elements in the modified configuration.

In this modified configuration, •the telephone function part 10 is provided with a terminal Antenna 35 and a terminal communication part 31, and the storage part 45 is formed with an electronic money. area 36a. The electronic money area 36a is configured with a program area 36b stored with a VALUE handling program, an electronic money ID, and the like, and a log data area 36c stored with a-log data concerning VALUE. handling.

The CPU 42 is capable of constituting an application part 26, a relay part 27, and a VALUE handling part 28 (FIG. 3), by executing an application program 45a, a relay program 45b, and the VALUE handling program stored in the storage part 45, respectively.

It is also possible for the storage part 45 to be stored with an interface-part program for constituting the interface part 11.

In this way, the telephone function part 10 in the modified configuration is allowed to be provided with a voice communications function, an Internet connecting function, and a VALUE handling function:

According to the modified configuration as described above, the following effects are obtained:

(1) It becomes unnecessary to package an IC chip for electronic money into the portable telephone 7, thereby allowing a reduced number of. parts, downsizing of the device, and a reduced cost. There can be further reduced an incidence rate of trouble.

(2) It is unnecessary to provide an electronic money function part 12, thereby allowing a saved power consumption to thereby reduce a burden of a user concerning electric charge.

The invention claimed is:

1. An information processing apparatus, comprising:
a telephone function part including:
a telephone antenna configured to transmit and receive wireless communications via an external base station, wherein the external base station is in communication with an electronic money server,
a first processor, and
a first memory storing first instructions, that when executed by the first processor, cause the first processor to perform the operations of:
receiving a first command from the electronic money server via the external base station and the telephone antenna, wherein the first command is an encrypted wireless communication; and
an electronic money function part including:
a terminal antenna configured to transmit and receive non-contact type communications,
a second processor,
a second memory storing second instructions, that when executed by the second processor, cause the second processor to perform the operations of:
storing a balance of electronic monetary value,
receiving a second command from an electronic money terminal via the terminal antenna, wherein the second command is a non-contact type communication, and
changing the balance of electronic monetary value stored in the second memory in response to at least one of the first command and the second command, wherein the first processor is in communication with the second processor.

2. The information processing apparatus according to claim 1, wherein the second processor and the second memory are in an IC chip.

3. The information processing apparatus according to claim 2, wherein the second instructions cause the second processor to receive the second command from the electronic money terminal in a contactless manner.

4. The information processing apparatus according to claim 3, wherein the operation of changing the balance of electronic monetary value decreases the balance of electronic monetary value.

5. The information processing apparatus according to claim 3, wherein the operation of changing the balance of electronic monetary value increases the balance of electronic monetary value.

6. The information processing apparatus according to claim 5, wherein the first command indicates an amount of electronic monetary value to increase the balance of electronic monetary value.

7. The information processing apparatus according to claim 6, wherein the first instructions further cause the first processor to perform the operation of transmitting a request to the electronic money server via the telephone antenna and the external base station, and wherein the received first command from the electronic money server via the external base station and the telephone antenna is a response to the request.

8. The information processing apparatus according to claim 1, wherein the first command is received in an electronic mail message.

9. The information processing apparatus according to claim 1, wherein the second instructions further cause the second processor to perform the operation of storing historical data of changes in the stored balance of electronic monetary value.

10. The information processing apparatus according to claim 9, further comprising a display device, and wherein the second instructions further cause the second processor to display the historical data on the display device.

11. An electronic money system comprising:
- an electronic money server;
- an external base station in communication with the electronic money server; and
- an information processing apparatus including:
  - a telephone antenna configured to transmit and receive wireless communications via the external base station,
  - a terminal antenna configured to transmit and receive non-contact type communications,
  - a processor, and
  - a memory storing instructions, which when executed by the processor, cause the processor to:
    - store a balance of electronic monetary value,
    - receive a first command from the electronic money server via the external base station and the telephone antenna, wherein the first command is an encrypted wireless communication,
    - decrypt the first command,
    - receive a second command from an electronic money terminal via the terminal antenna, wherein the second command is a non-contact type communication, and
    - change the balance of electronic monetary value stored in the memory in response to at least one of the decrypted first command and the second command.

* * * * *